(12) United States Patent
Nishio et al.

(10) Patent No.: US 9,188,770 B2
(45) Date of Patent: Nov. 17, 2015

(54) ZOOM LENS AND IMAGE PICKUP APPARATUS EQUIPPED WITH SAME

(71) Applicants: OLYMPUS IMAGING CORP., Tokyo (JP); OLYMPUS CORPORATION, Tokyo (JP)

(72) Inventors: Akinori Nishio, Tokyo (JP); Mayu Miki, Tokyo (JP); Masahito Watanabe, Tokyo (JP); Tomoyuki Satori, Kanagawa (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/213,371

(22) Filed: Mar. 14, 2014

(65) Prior Publication Data

US 2014/0268365 A1 Sep. 18, 2014

(30) Foreign Application Priority Data

Mar. 14, 2013 (JP) ................................ 2013-052199

(51) Int. Cl.
*G02B 15/14* (2006.01)
*G02B 15/173* (2006.01)
*G02B 7/04* (2006.01)

(52) U.S. Cl.
CPC ................ *G02B 15/173* (2013.01); *G02B 7/04* (2013.01)

(58) Field of Classification Search
CPC ......................................................... G02B 7/04
USPC ......................................................... 359/683
See application file for complete search history.

(56) References Cited

U.S. PATENT DOCUMENTS 7,593,164 B2 9/2009 Souma
2014/0036136 A1* 2/2014 Kimura ......................... 348/345

FOREIGN PATENT DOCUMENTS

JP 2008-304706 12/2008

* cited by examiner

*Primary Examiner* — William Choi
(74) *Attorney, Agent, or Firm* — Kenyon & Kenyon LLP

(57) ABSTRACT

A zoom lens consists of, in order from the object side, a first lens unit having a positive refractive power, a second lens unit having a negative refractive power, a third lens unit having a positive refractive power, a fourth lens unit having a negative refractive power, and a fifth lens unit having a positive refractive power. The first lens unit and the second lens unit move during zooming from the wide angle end to the telephoto end. The zoom lens satisfies the following conditional expressions (1), (2), and (3):

$f_t/f_w > 6.0$ (1), $Fno_{(T)} < 3.5$ (2), and $\Sigma d/f_t < 0.6$ (3).

13 Claims, 14 Drawing Sheets

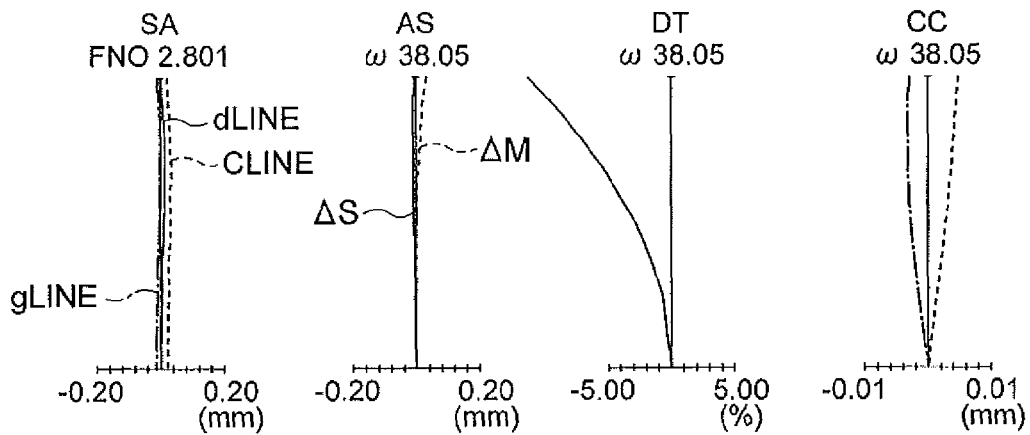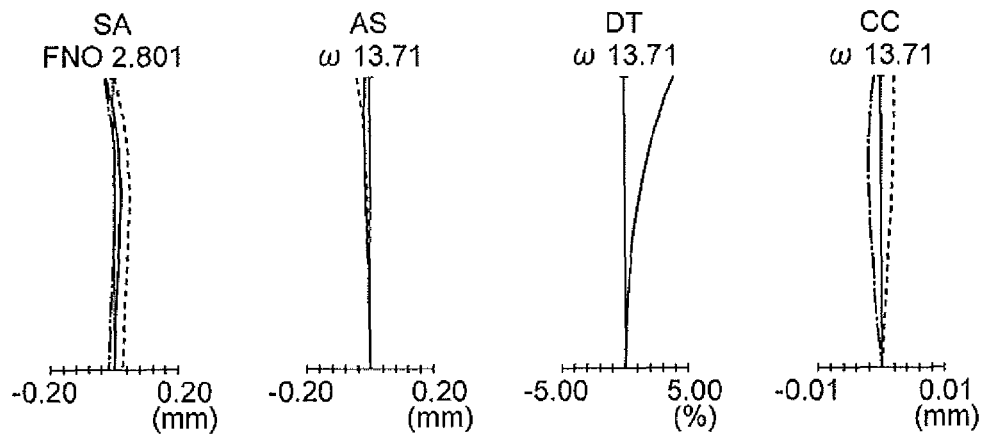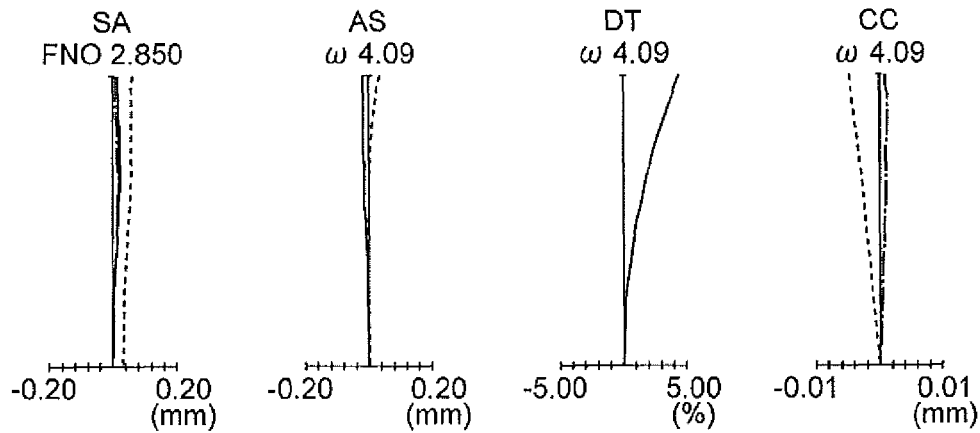

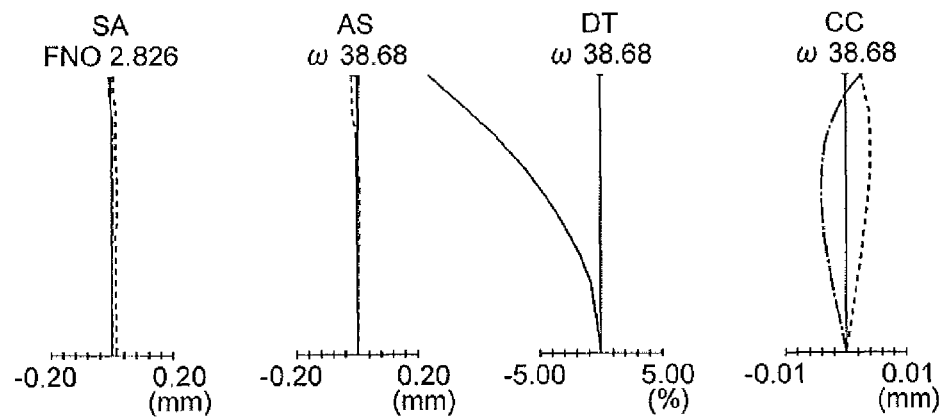
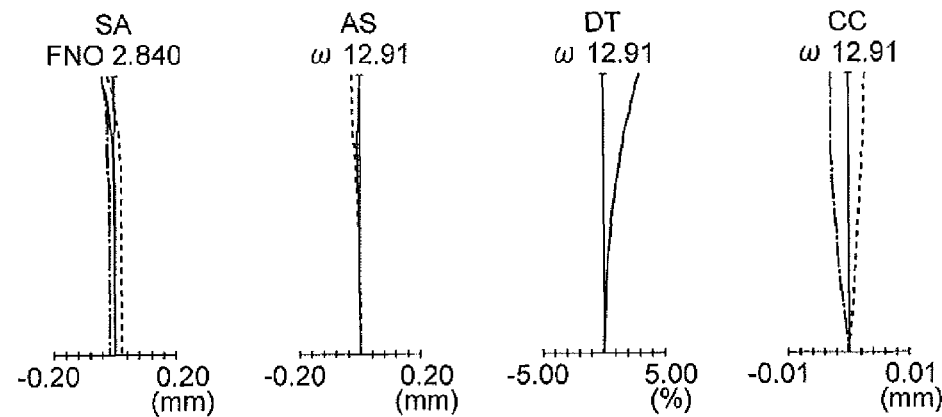
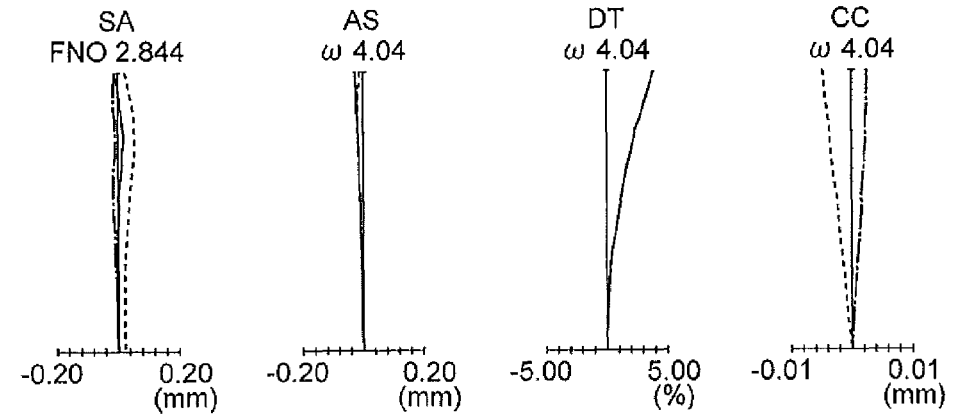

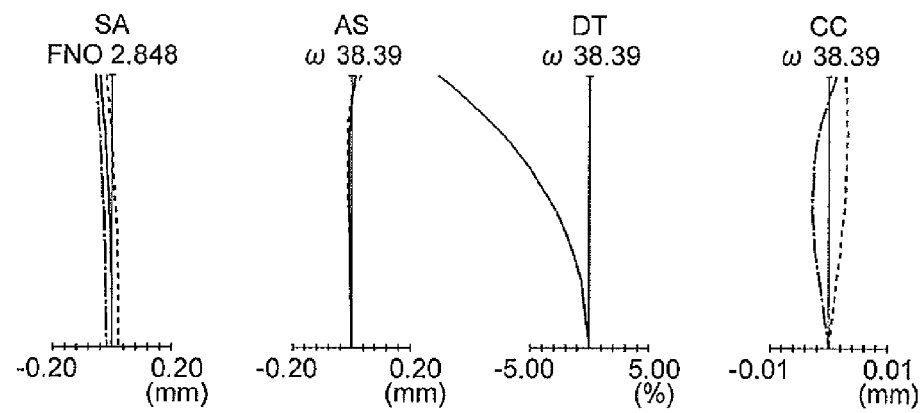
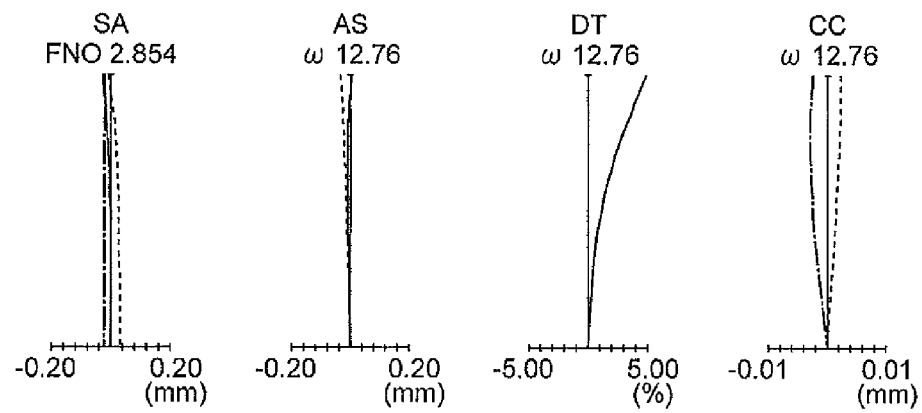
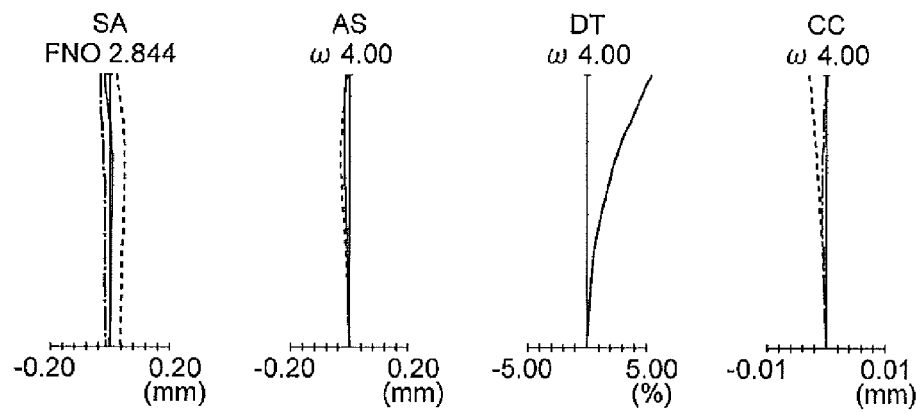

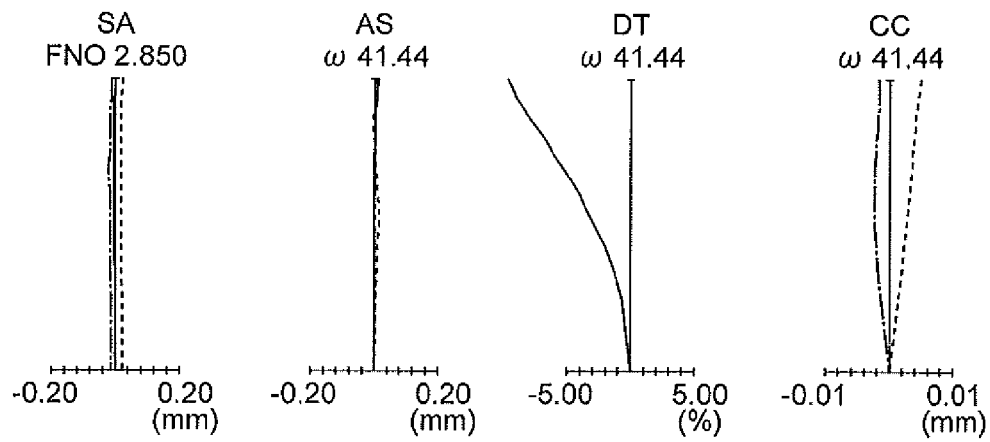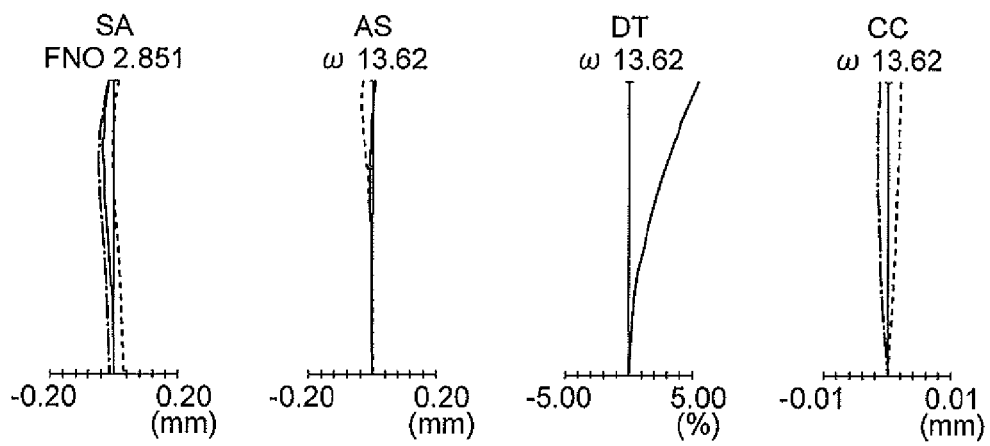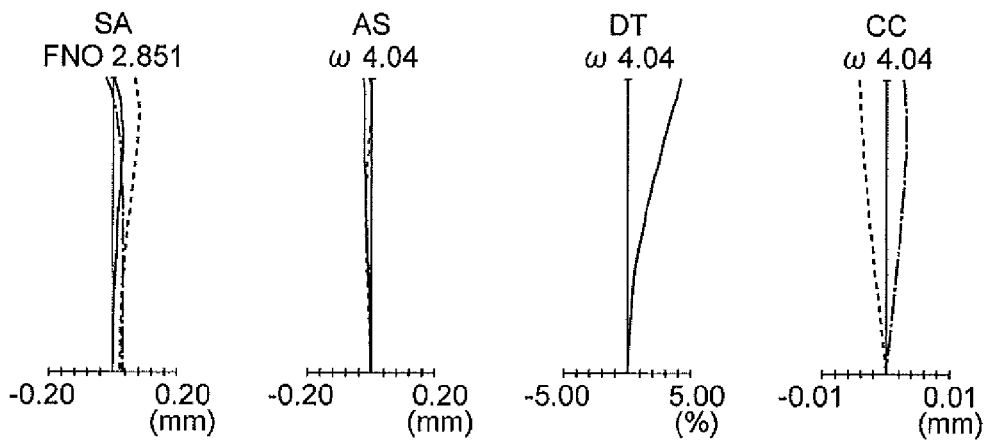

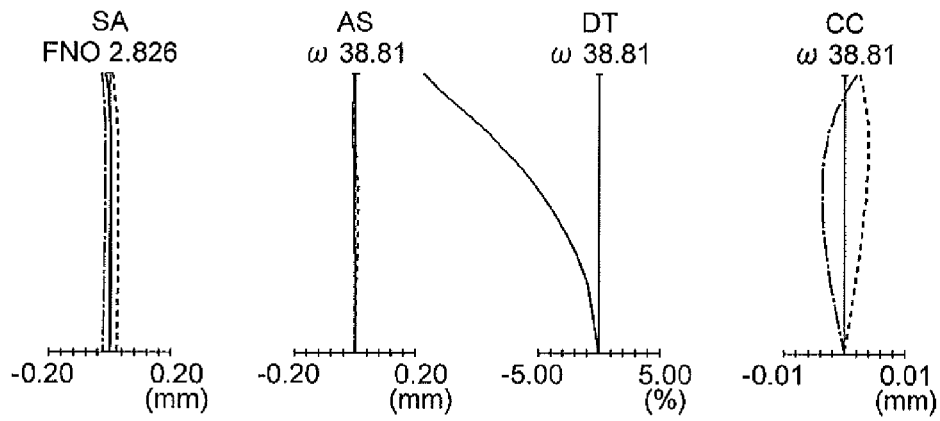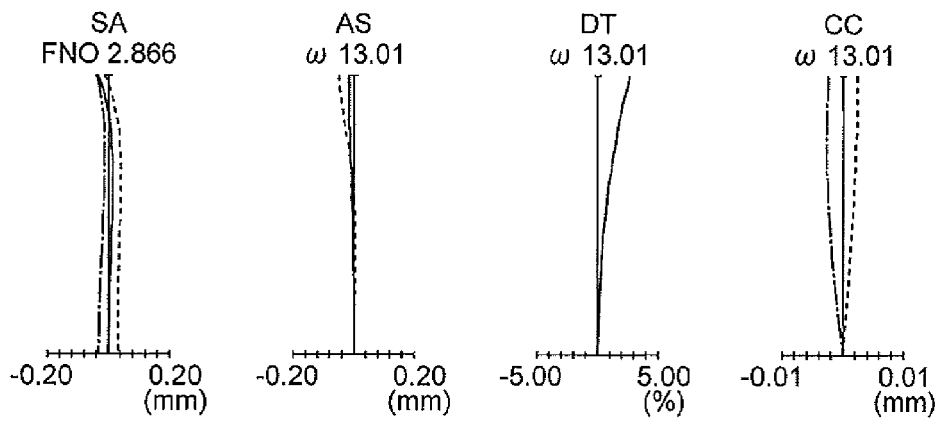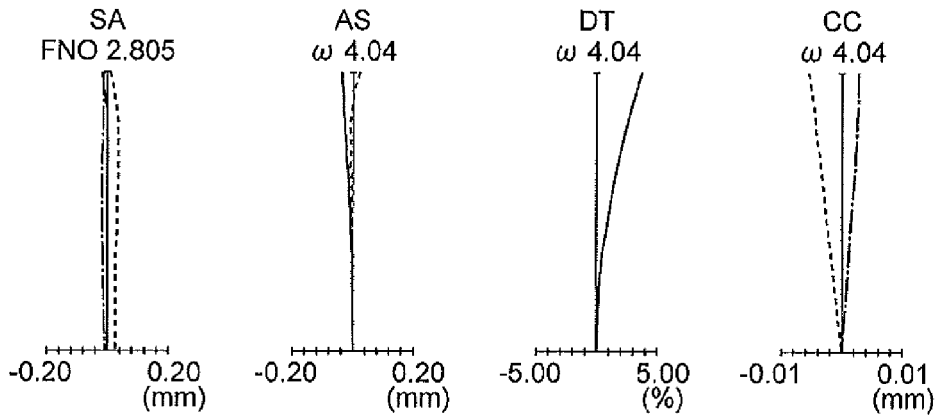

ZOOM LENS AND IMAGE PICKUP APPARATUS EQUIPPED WITH SAME

CROSS-REFERENCE TO RELATED APPLICATION

The present application is based upon and claims the benefit of priority from the prior Japanese Patent Application No. 2013-052199 filed on Mar. 14, 2013; the entire contents of which are incorporated herein by reference.

BACKGROUND OF THE INVENTION

1. Field of the Invention

The present invention relates to a zoom lens and an image pickup apparatus equipped with the same.

2. Description of the Related Art

In recent times, digital cameras that pick up an image of an object using a solid state image pickup element such as a CCD or CMOS have replaced film cameras and become the mainstream. Furthermore, various categories of digital cameras ranging from popular-priced compact type cameras to function-rich cameras for professionals have been developed.

Users of popular-priced digital cameras wish to enjoy easy shooting in various shooting situations anywhere at any time. For this reason, such users tend to favor small size digital cameras, especially slim digital cameras that can be conveniently carried in a pocket of clothes or a bag. Therefore, a further reduction in the size of the taking lens system is demanded.

On the other hand, there is a trend toward an increase in the number of pixels of image pickup elements, and high optical performance consistent with the increased numbers of pixels of image pick up elements are demanded. Furthermore, while zoom lenses having zoom ratios higher than 10 have been developed to widen the variety of shooting and have become popular, a further increase in the zoom ratio is expected.

Digital cameras capable of performing image processing for extending the sensitivity range or dynamic range to enable shooting in high-contrast situations have also been developed, enabling shooting without limitations in situations.

In shooting in dark places, while contrast can be corrected electronically to some extent, use of a large-diameter lens or a fast lens allows shooting in darker places and will increase the variety of scenes that can be shot.

Since fast, large-diameter lenses enable clear image shooting even with small incident light quantities, they can provide increased choice, such as higher shutter speeds in continuous shooting of a moving object, to photographers. For this reason, large-diameter lenses have been receiving attention in recent times.

As a prior art zoom lens having a relatively high zoom ratio and high speed (or small F-number) throughout the entire focal length range from the wide angle end to the telephoto end, a zoom lens including, in order from the object side, a positive first lens unit, a negative second lens unit, a positive third lens unit, negative fourth lens unit, and a positive fifth lens unit have been known (Japanese Patent Application Laid-Open No. 2008-304706).

SUMMARY OF THE INVENTION

A zoom lens according to a first aspect of the present invention consists of, in order from the object side:
a first lens unit having a positive refractive power;
a second lens unit having a negative refractive power;
a third lens unit having a positive refractive power;
a fourth lens unit having a negative refractive power; and
a fifth lens unit having a positive refractive power, wherein
the first lens unit and the fifth lens unit move during zooming from the wide angle end to the telephoto end, and
the following conditional expressions (1), (2), and (3) are satisfied:

$$ft/fw>6.0 \tag{1}$$

$$Fno(T)<3.5 \tag{2, and}$$

$$\Sigma d/ft<0.6 \tag{3}$$

where ft is the focal length of the entire zoom lens system at the telephoto end, fw is the focal length of the entire zoom lens system at the wide angle end, Fno(T) is the F-number of the entire zoom lens system at the telephoto end, and Σd is the sum of the thicknesses of the first to fifth lens units, where the thickness of each lens unit refers to the distance on the optical axis from the lens surface closest to the object side to the lens surface closest to the image side in each lens unit.

A zoom lens according to a second aspect of the present invention consists of, in order from the object side:
a first lens unit having a positive refractive power;
a second lens unit having a negative refractive power;
a third lens unit having a positive refractive power;
a fourth lens unit having a negative refractive power; and
a fifth lens unit having a positive refractive power, wherein
the second lens unit consists of three lenses,
the fifth lens unit consists of one lens,
the first lens unit moves during zooming from the wide angle end to the telephoto end, and
the following conditional expressions (1), (2), and (3) are satisfied, $$ft/fw>6.0 \tag{1}$$

$$Fno(T)<3.5 \tag{2, and}$$

$$\Sigma d/ft<0.6 \tag{3}$$

where ft is the focal length of the entire zoom lens system at the telephoto end, fw is the focal length of the entire zoom lens system at the wide angle end, Fno(T) is the F-number of the entire zoom lens system at the telephoto end, and Σd is the sum of the thicknesses of the first to fifth lens units, where the thickness of each lens unit refers to the distance on the optical axis from the lens surface closest to the object side to the lens surface closest to the image side in each lens unit.

An image pickup apparatus according to the present invention comprises a zoom lens according to any one of the above-described aspects of the present invention and an image pickup element disposed on the image side of the zoom lens and having an image pickup surface that receives an image formed by the zoom lens.

BRIEF DESCRIPTION OF THE DRAWINGS

FIG. 1A shows the state at the wide angle end, FIG. 1B shows the state in an intermediate focal length state, and FIG. 1C shows the state at the telephoto end;

FIG. 2A shows the state at the wide angle end, FIG. 2B shows the state in an intermediate focal length state, and FIG. 2C shows the state at the telephoto end;

FIG. 3A shows the state at the wide angle end, FIG. 3B shows the state in an intermediate focal length state, and FIG. 3C shows the state at the telephoto end;

FIG. 4A shows the state at the wide angle end, FIG. 4B shows the state in an intermediate focal length state, and FIG. 4C shows the state at the telephoto end;

FIG. 5A shows the state at the wide angle end, FIG. 5B shows the state in an intermediate focal length state, and FIG. 5C shows the state at the telephoto end;

FIGS. 6A to 6L are aberration diagrams of the zoom lens according to the first embodiment in the state in which the zoom lens is focused on an object point at infinity;

FIGS. 7A to 7L are aberration diagrams of the zoom lens according to the second embodiment in the state in which the zoom lens is focused on an object point at infinity;

FIGS. 8A to 8L are aberration diagrams of the zoom lens according to the third embodiment in the state in which the zoom lens is focused on an object point at infinity;

FIGS. 9A to 9L are aberration diagrams of the zoom lens according to the fourth embodiment in the state in which the zoom lens is focused on an object point at infinity;

FIGS. 10A to 10L are aberration diagrams of the zoom lens according to the fifth embodiment in the state in which the zoom lens is focused on an object point at infinity;

DETAILED DESCRIPTION OF THE INVENTION

Figure 1A:
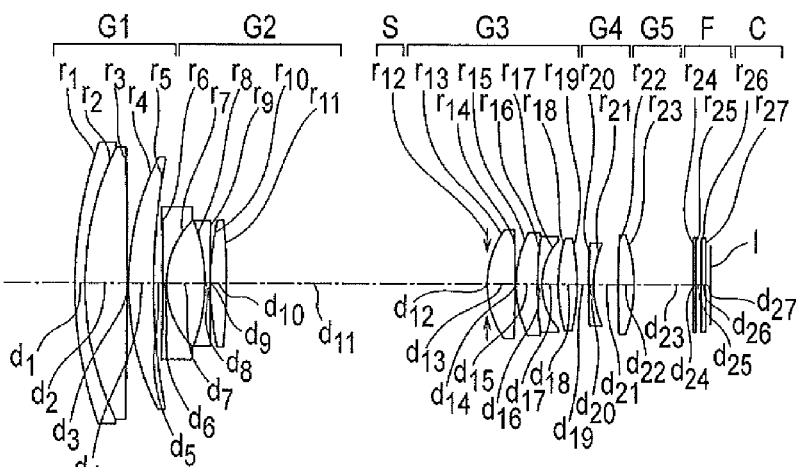
FIGS. 1A, 1B, and 1C are cross sectional views of a zoom lens according to a first example of the present invention taken along its optical axis, showing its configuration in the state in which the zoom lens is focused on an object point at infinity, where

In the following, embodiments and examples of the zoom lens and the image pickup apparatus equipped with the same according to the present invention will be described in detail with reference to the drawings. It should be understood, however, that the present invention is by no means limited by the embodiments and examples.

Operations and advantages of the zoom lens according to embodiments will be described prior to the description of examples.

A zoom lens according to an embodiment of the present invention is composed of, in order from the object side:
  a first lens unit having a positive refractive power;
  a second lens unit having a negative refractive power;
  a third lens unit having a positive refractive power;
  a fourth lens unit having a negative refractive power; and
  a fifth lens unit having a positive refractive power, wherein
    the first lens unit and the fifth lens unit move during zooming from the wide angle end to the telephoto end, and
    the following conditional expressions (1), (2), and (3) are satisfied:

$$f_t/f_w > 6.0 \quad (1),$$

$$Fno_{(T)} < 3.5 \quad (2), \text{and}$$

$$\Sigma d/f_t < 0.6 \quad (3),$$

where $f_t$ is the focal length of the entire zoom lens system at the telephoto end, $f_w$ is the focal length of the entire zoom lens system at the wide angle end, $Fno_{(T)}$ is the F-number of the entire zoom lens system at the telephoto end, and $\Sigma d$ is the sum of the thicknesses of the first to fifth lens units, where the thickness of each lens unit refers to the distance on the optical axis from the lens surface closest to the object side to the lens surface closest to the image side in each lens unit.

The zoom lens according to this embodiment includes, in order from the object side, a first lens unit having a positive refractive power, a second lens unit having a negative refractive power, a third lens unit having a positive refractive power, a fourth lens unit having a negative refractive power, and a fifth lens unit having a positive refractive power. In this zoom lens, the first lens unit and the fifth lens unit move during zooming from the wide angle end to the telephoto end of the focal length range.

With the above-described configuration, the lens units are adapted to efficiently contribute to the variation of magnification in cooperation, whereby the variation of aberrations with zooming can be kept small, and the zoom lens can have a high zoom ratio as an optical system while being small in the overall length with the amount of shift of each lens unit being not so large.

Conditional expression (1) is a condition relating to the zoom ratio of the zoom lens. If conditional expression (1) is satisfied, the zoom lens can have a high zoom ratio.

Conditional expression (2) is a condition relating to the F-number of the zoom lens at the telephoto end of the focal length range. If the conditional expression (2) is satisfied, the zoom lens can have appropriately high speed at the telephoto end.

Conditional expression (3) is a condition relating to the sum of the thicknesses of the first to fifth lens units. Conditional expression (3) limits the value of the sum of the thicknesses normalized by the focal length at the telephoto end. Here, the thickness of each lens unit refers to the distance on the optical axis from the lens surface closest to the object side to the lens surface closest to the image side in each lens unit. Satisfying conditional expression (3) makes the overall length of the zoom lens small.

If the value of $\Sigma d/f_t$ in conditional expression (3) exceeds the upper limit, the sum of the thicknesses of the first to fifth lens units is so large and the overall length of the zoom lens is so large accordingly that it is difficult to house the zoom lens in a collapsed state. In other words, it is difficult to make the overall length of the zoom lens small.

A zoom lens according to another aspect of the embodiment is composed of, in order from the object side,
  a first lens unit having a positive refractive power;
  a second lens unit having a negative refractive power;
  a third lens unit having a positive refractive power;
  a fourth lens unit having a negative refractive power; and
  a fifth lens unit having a positive refractive power, wherein
    the second lens unit is composed of three lenses,
    the fifth lens unit is composed of one lens, the first lens unit moves during zooming from the wide angle end to the telephoto end, and the following conditional expressions (1), (2), and (3) are satisfied, $$f_t/f_w > 6.0 \quad (1),$$

$$Fno_{(T)} < 3.5 \quad (2), \text{and}$$

$$\Sigma d/f_t < 0.6 \quad (3),$$

where $f_t$ is the focal length of the entire zoom lens system at the telephoto end, $f_w$ is the focal length of the entire zoom lens system at the wide angle end, $Fno_{(T)}$ is the F-number of the entire zoom lens system at the telephoto end, and $\Sigma d$ is the sum of the thicknesses of the first to fifth lens units, where the thickness of each lens unit refers to the distance on the optical axis from the lens surface closest to the object side to the lens surface closest to the image side in each lens unit.

The zoom lens according to this embodiment includes, in order from the object side, a first lens unit having a positive refractive power, a second lens unit having a negative refractive power, a third lens unit having a positive refractive power, a fourth lens unit having a negative refractive power, and a fifth lens unit having a positive refractive power. In this zoom lens, the second lens unit is composed of three lenses, the fifth lens unit is composed of one lens, and the first lens unit moves toward the object side during zooming from the wide angle end to the telephoto end.

With the above-described configuration, the lens units are adapted to efficiently contribute to the variation of magnification in cooperation, whereby the variation of aberrations with zooming can be kept small, and the optical system can have a high zoom ratio while being small in the overall length with the amount of shift of each lens units being not so large.

Moreover, since the second and fifth lens units are composed of a minimized number of lenses, the thickness of these lens units can be small. Thus, the optical system can be compact.

In the zoom lens according to the embodiment, it is preferred that the second lens unit and the third lens unit move during zooming from the wide angle end to the telephoto end, and the following conditional expression (4) be satisfied:

$$2 < \Delta_{2G}/|\Delta_{3G}| < 5 \quad (4),$$

where $\Delta_{2G}$ is the amount of shift of the second lens unit with zooming from the wide angle end to the telephoto end, $\Delta_{3G}$ is the amount of shift of the third lens unit with zooming from the wide angle end to the telephoto end, where the amounts of shift are calculated as the amounts of shift from the positions of the respective lens units at the wide angle end, and shifts toward the image plane are represented by positive values.

Conditional expression (4) specifies a condition relating to the ratio of the amount of shift of the second lens unit and the amount of shift of the third lens unit. If the value of $\Delta_{2G}/|\Delta_{3G}|$ in conditional expression (4) falls below the lower limit, the amount of shift of the third lens unit with zooming is so large that it is difficult to make the overall length of the zoom lens appropriately small.

Furthermore, when the amount of shift of the third lens unit with zooming is large, a large stop diameter is necessitated when the zoom lens is to be designed to have appropriately high speed at the telephoto end, leading to a large lens diameter in the third lens unit.

Still further, when the lens diameter of the third lens unit is large, the lens thickness also needs to be large. Therefore, it is difficult to make the zoom lens compact.

Still further, when the lens diameter of the third lens unit is large, the volume and the weight of the third lens unit would also be large. Therefore, in the case where the third lens unit serves as a lens unit that is driven for image stabilization, a strong external force for driving the third lens unit is required. This is not desirable.

On the other hand, if the value of $\Delta_{2G}/|\Delta_{3G}|$ in conditional expression (4) exceeds the upper limit, the amount of shift of the second lens unit with zooming is so large that the overall length of the zoom lens cannot be made small.

In the zoom lens according to the embodiment, it is preferred that the second lens unit move during zooming from the wide angle end to the telephoto end, and the following conditional expression (5) be satisfied:

$$0.15 \leq \Delta_{2G}/L_t \leq 0.5 \quad (5),$$

where $\Delta_{2G}$ is the amount of shift of the second lens unit in the zoom lens during zooming from the wide angle end to the telephoto end, shifts toward the image plane being represented by positive values, and $L_t$ is the overall length of the entire zoom lens system at the telephoto end.

Conditional expression (5) is a condition relating to the amount of shift of the second lens unit. Conditional expression (5) limits the value of the amount of shift of the second lens unit normalized by the overall length of the entire zoom lens system at the telephoto end.

If the value of $\Delta_{2G}/L_t$ in conditional expression (5) falls below the lower limit, the amount of shift of the second lens unit with zooming is so small that it is difficult to achieve an appropriately high zoom ratio.

On the other hand, if the value of $\Delta_{2G}/L_t$ in conditional expression (5) exceeds the upper limit, the amount of shift of the second lens unit with zooming is so large that it is difficult to make the overall length of the zoom lens small.

In the zoom lens according to the embodiment, it is preferred that the third lens unit move during zooming from the wide angle end to the telephoto end, and the following conditional expression (6) be satisfied:

$$0.05 \leq |\Delta_{3G}|/L_t \leq 0.2 \quad (6),$$

where $\Delta_{3G}$ is the amount of shift of the third lens unit in the zoom lens during zooming from the wide angle end to the telephoto end, shifts toward the image plane being represented by positive values, and $L_t$ is the overall length of the entire zoom lens system at the telephoto end.

Conditional expression (6) is a condition relating to the amount of shift of the third lens unit. Conditional expression (6) limits the value of the amount of shift of the third lens unit normalized by the overall length of the entire zoom lens system at the telephoto end.

If the value of $\Delta_{3G}/L_t$ in conditional expression (6) falls below the lower limit, the amount of shift of the third lens unit with zooming is so small that it is difficult to achieve an appropriately high zoom ratio.

If the value of $\Delta_{3G}/L_t$ in conditional expression (6) exceeds the upper limit, the amount of shift of the third lens unit with zooming is so large that it is difficult to make the overall length of the zoom lens appropriately small. Furthermore, when the amount of shift of the third lens unit with zooming is large, a large stop diameter is necessitated when the zoom lens is to be designed to have appropriately high speed at the telephoto end, leading to a large lens diameter in the third lens unit.

Still further, when the lens diameter of the third lens unit is large, the lens thickness also needs to be large. Therefore, it is difficult to make the zoom lens compact.

Still further, when the lens diameter of the third lens unit is large, the volume and the weight of the third lens unit would also be large. Therefore, in the case where the third lens unit serves as a lens unit that is driven for image stabilization, a strong external force for driving the third lens unit is required. This is not desirable.

In the zoom lens according to the embodiment, it is preferred that the following conditional expression (7) be satisfied:

$$0.2<(\beta_{2T}/\beta_{2W})/(f_t/f_w)<0.6 \qquad (7),$$

where $\beta_{2T}$ is the lateral magnification of the second lens unit at the telephoto end of the focal length range of the zoom lens, and $\beta_{2W}$ is the lateral magnification of the second lens unit at the wide angle end of the focal length range of the zoom lens.

Conditional expression (7) is a condition relating to the proportion of the contribution of the second lens unit to the magnification variation, among the lens units contributing to the magnification variation.

If the value of $(\beta_{2T}/\beta_{2W})/(f_t/f_w)$ in conditional expression (7) falls below the lower limit, the contribution of the second lens unit to the magnification variation is so small that the other lens units need to be designed to provide large contributions to the magnification variation, undesirably leading to increased spherical aberration and coma.

If the value of $(\beta_{2T}/\beta_{2W})/(f_t/f_w)$ in conditional expression (7) exceeds the upper limit, curvature of field and chromatic aberration of magnification in the focal length range near the wide angle end will increase undesirably.

In the zoom lens according to the embodiment, it is preferred that the following conditional expression (8) be satisfied:

$$0.1<(\beta_{3T}/\beta_{3W})/(f_t/f_w)<0.3 \qquad (8),$$

where $\beta_{3T}$ is the lateral magnification of the third lens unit at the telephoto end of the focal length range of the zoom lens, and $\beta_{3W}$ is the lateral magnification of the third lens unit at the wide angle end of the focal length range of the zoom lens.

Conditional expression (8) is a condition relating to the proportion of the contribution of the third lens unit to the magnification variation, among the lens units contributing to the magnification variation.

If the value of $(\beta_{3T}/\beta_{3W})/(f_t/f_w)$ in conditional expression (8) falls below the lower limit, the contribution of the third lens unit to the magnification variation is so small that the other lens units need to be designed to provide large contributions to the magnification variation, undesirably leading to increased curvature of field and chromatic aberration of magnification.

If the value of $(\beta_{3T}/\beta_{3W})/(f_t/f_w)$ in conditional expression (8) exceeds the upper limit, spherical aberration and coma will increase undesirably.

In the zoom lens according to the embodiment, it is preferred that the following conditional expression (9) be satisfied:

$$0.05<|f_2|/f_t<0.2 \qquad (9),$$

where $f_2$ is the focal length of the second lens unit.

Conditional expression (9) specifies an appropriate range for the value of the ratio of the focal length of the second lens unit and the focal length of the entire zoom lens system at the telephoto end.

If the value of $|f_2|/f_t$ in conditional expression (9) exceeds the upper limit, the refractive power of the second lens unit is low, leading to a large overall length of the zoom lens. Therefore, it is difficult to make the zoom lens compact.

If the value of $|f_2|/f_t$ in conditional expression (9) falls below the lower limit, the refractive power of the second lens unit is unduly high, and the balance of the Petzval sum is deteriorated in the focal length range near the wide angle end. Then, it is not possible to keep the image plane flat, resulting in large curvature of field. Furthermore, unduly high refractive power of the second lens unit causes large chromatic aberration of magnification in the focal length range near the wide angle end, leading to deterioration of the performance.

In the zoom lens according to the present invention, it is preferred that the following conditional expression (10) be satisfied:

$$0.05<f_3/f_t<0.3 \qquad (10),$$

where $f_3$ is the focal length of the third lens unit.

Conditional expression (10) specifies an appropriate range for the value of the ratio of the focal length of the third lens unit and the focal length of the entire zoom lens system at the telephoto end.

If the value of $|f_3|/f_t$ in conditional expression (10) exceeds the upper limit, the refractive power of the third lens unit is low, leading to a large overall length of the zoom lens. Therefore, it is difficult to make the zoom lens compact.

If the value of $|f_3|/f_t$ in conditional expression (10) falls below the lower limit, the refractive power of the third lens unit is unduly high, and large spherical aberration and coma are generated. If the number of lenses is increased to reduce the aberrations, the thickness of the third lens unit necessarily increases. Then, it is difficult to make the zoom lens compact.

In the zoom lens according to the embodiment, it is preferred that the following conditional expression (11) be satisfied:

$$0.1<f_5/f_t<0.8 \qquad (11),$$

where $f_5$ is the focal length of the fifth lens unit.

Conditional expression (11) specifies an appropriate range for the value of the ratio of the focal length of the fifth lens unit and the focal length of the entire zoom lens system at the telephoto end.

If the value of $|f_5|/f_t$ in conditional expression (11) exceeds the upper limit, the refractive power of the fifth lens unit is low, leading to a large overall length of the zoom lens. Therefore, it is difficult to make the zoom lens compact.

If the value of $|f_5|/f_t$ in conditional expression (11) falls below the lower limit, large curvature of field and chromatic aberration of magnification are generated.

In the zoom lens according to the embodiment, it is preferred that the fourth lens unit be composed of one lens.

If the fourth lens unit is composed of one lens, the constitution of the fourth lens unit is minimized, and the thickness of the fourth lens unit is kept small. Therefore, the optical system can be made compact.

In the zoom lens according to the embodiment, it is preferred that the fourth lens unit move during zooming.

If the fourth lens unit is moved during zooming, the fourth lens unit can efficiently contribute to correction of aberrations such as curvature of field and spherical aberration and to the magnification variation. In consequence, contributions to the magnification variation are efficiently shared among the lens units. Therefore, it is possible to provide an optical system that has a high zoom ratio with small variation in aberrations during zooming while keeping the amounts of shift of the lens units small to make the optical system compact.

An image pickup apparatus according to an embodiment includes a zoom lens according to any one of the above-described aspect and an image pickup element disposed on the image side of the zoom lens and having an image pickup surface that receives an image formed by the zoom lens.

With this configuration, contributions to the magnification variation are efficiently shared among the lens units. Therefore it is possible to provide an image pickup apparatus including an optical system that has a high zoom ratio with small variation in aberrations during zooming while keeping the amounts of shift of the lens units small to make the optical system compact.

It is preferred that two or more of the above-described features be adopted in combination.

It is more preferred that the upper and/or lower limit values in the conditional expressions presented in the foregoing be further limited as follows in order that the advantages can be enjoyed more surely.

In conditional expression (1), it is more preferred that the lower limit value be 8.0.

In conditional expression (2), it is more preferred that the upper limit value be 3.0.

In conditional expression (3), it is more preferred that the upper limit value be 0.5.

In conditional expression (4), it is more preferred that the upper limit value be 3, and the lower limit value be 2.1.

In conditional expression (5), it is more preferred that the upper limit value be 0.4, and the lower limit value be 0.18.

In conditional expression (6), it is more preferred that the upper limit value be 0.15, and the lower limit value be 0.07.

In conditional expression (7), it is more preferred that the upper limit value be 0.5, and the lower limit value be 0.25.

In conditional expression (8), it is more preferred that the upper limit value be 0.25, and the lower limit value be 0.11.

In conditional expression (9), it is more preferred that the upper limit value be 0.18, and the lower limit value be 0.1.

In conditional expression (10), it is more preferred that the upper limit value be 0.25, and the lower limit value be 0.1.

In conditional expression (11), it is more preferred that the upper limit value be 0.6, and the lower limit value be 0.2.

Embodiments from a first embodiment to a fifth embodiment of the zoom lens will be described below.

Figure 1B:
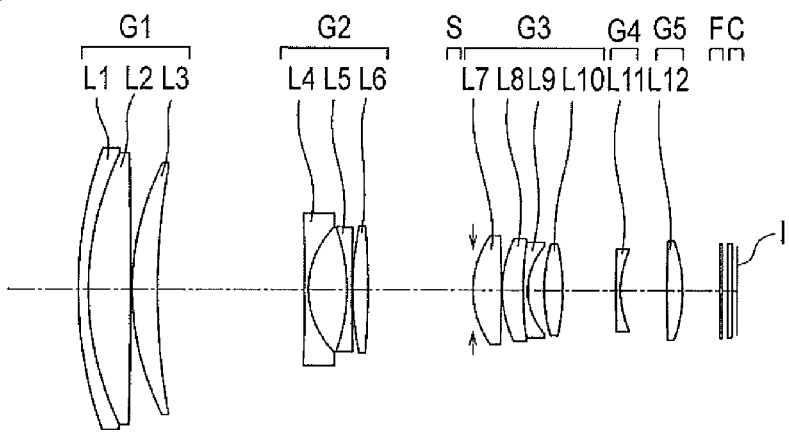
Figure 1C:
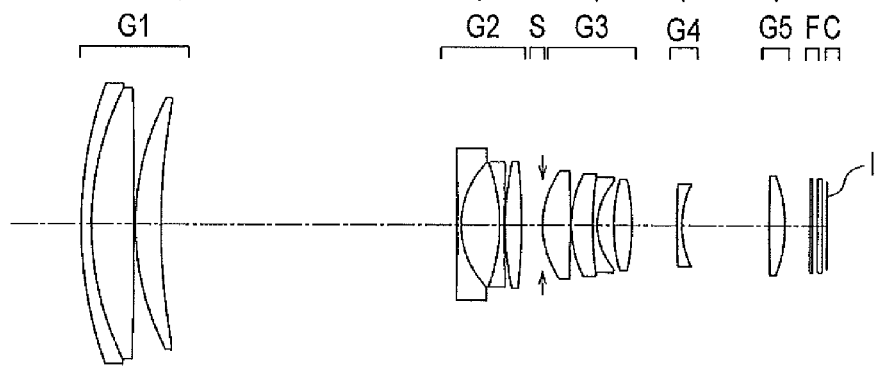
Figure 2A:
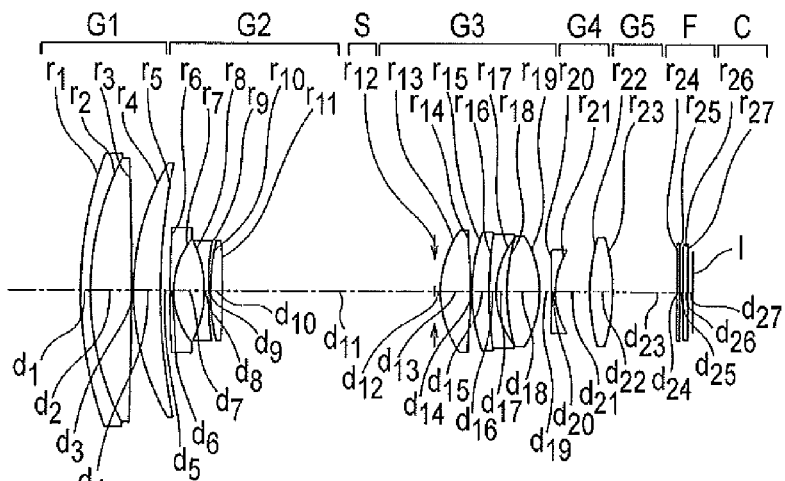
FIGS. 2A, 2B, and 2C are cross sectional views of a zoom lens according to a second example of the present invention taken along its optical axis, showing its configuration in the state in which the zoom lens is focused on an object point at infinity, where
Figure 2B:
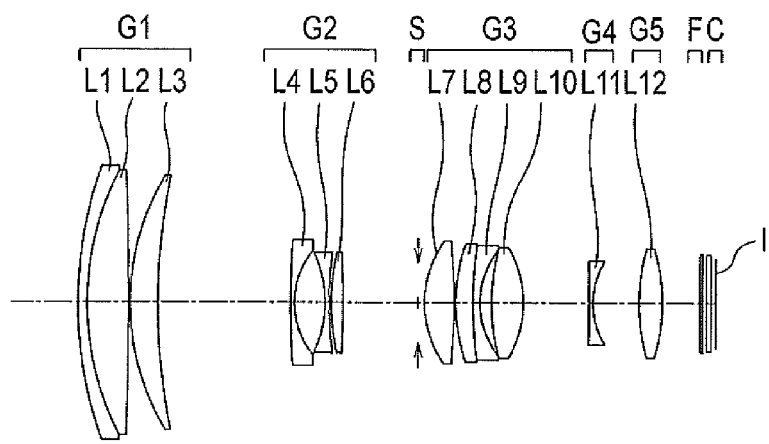
Figure 2C:
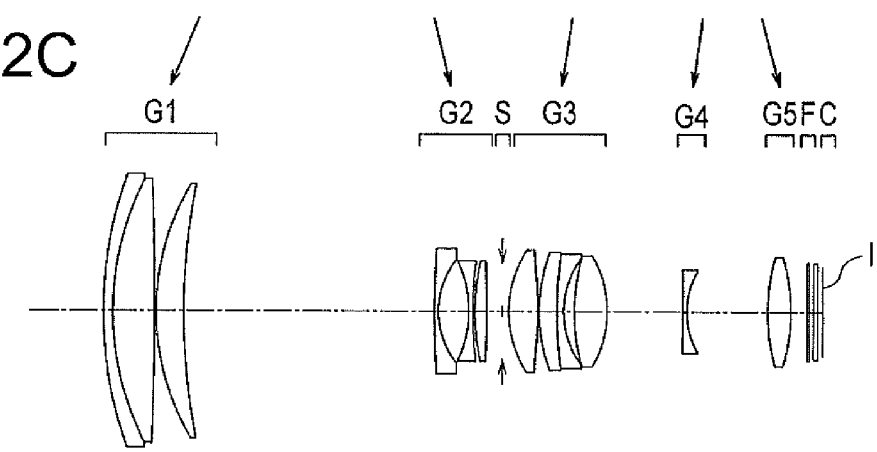
Figure 3A:
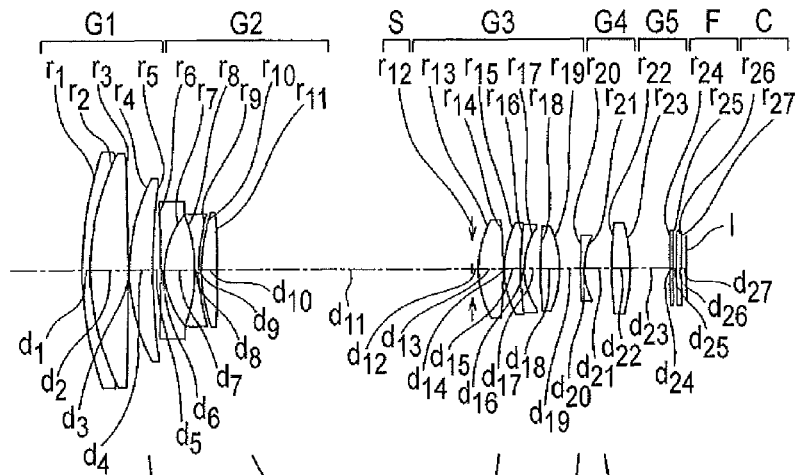
FIGS. 3A, 3B, and 3C are cross sectional views of a zoom lens according to a third example of the present invention taken along its optical axis, showing its configuration in the state in which the zoom lens is focused on an object point at infinity, where
Figure 3B:
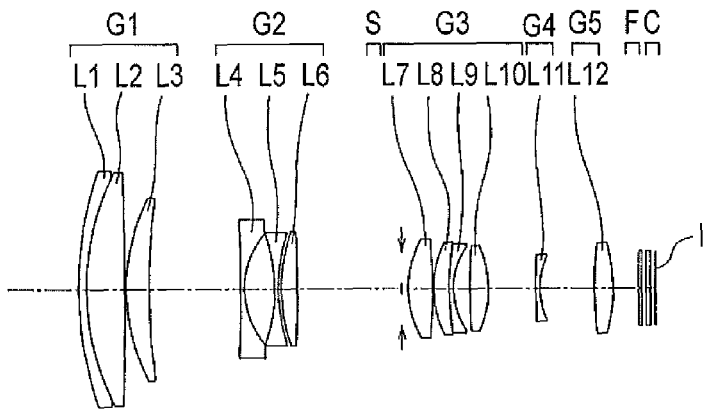
Figure 3C:
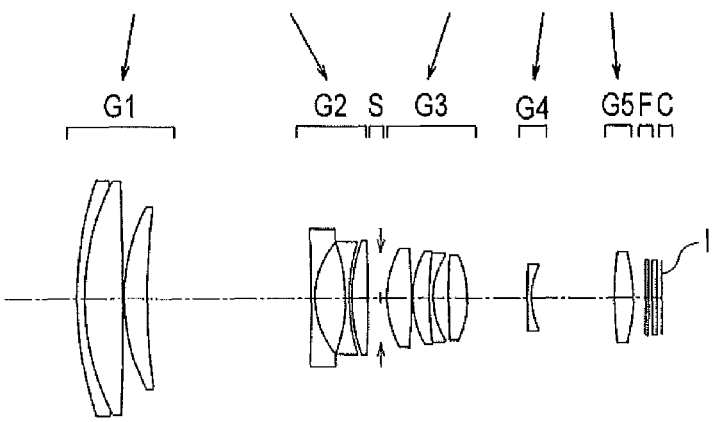
Figure 4A:
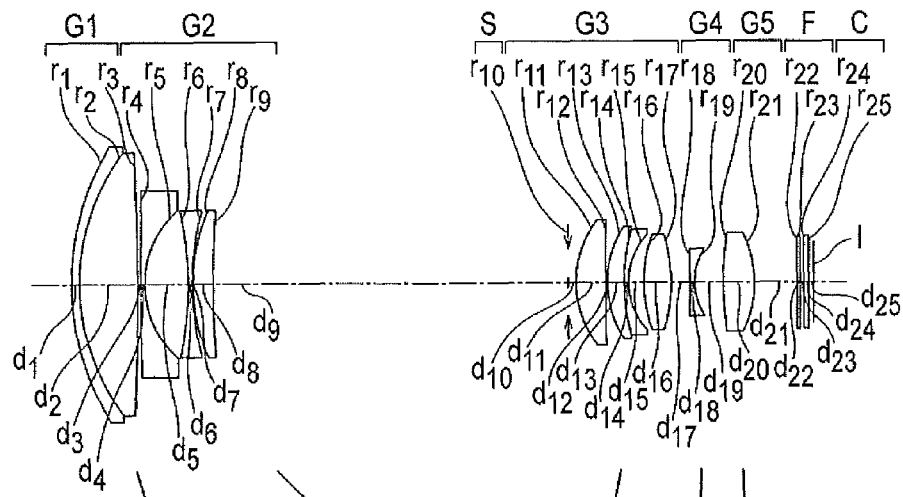
FIGS. 4A, 4B, and 4C are cross sectional views of a zoom lens according to a fourth example of the present invention taken along its optical axis, showing its configuration in the state in which the zoom lens is focused on an object point at infinity, where
Figure 4B:
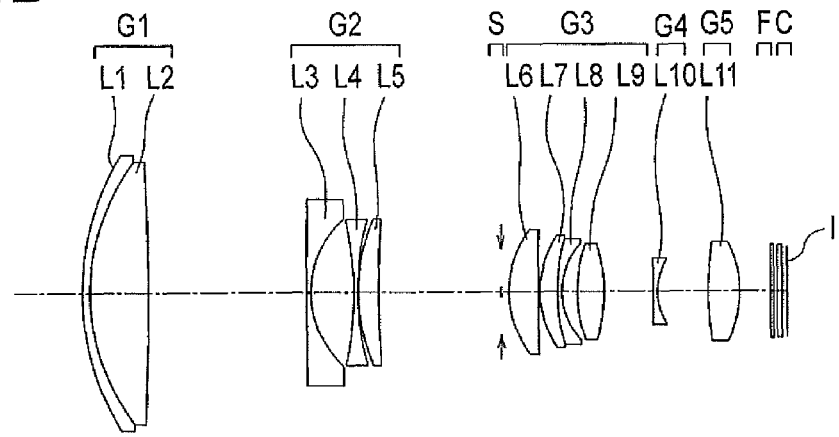
Figure 4C:
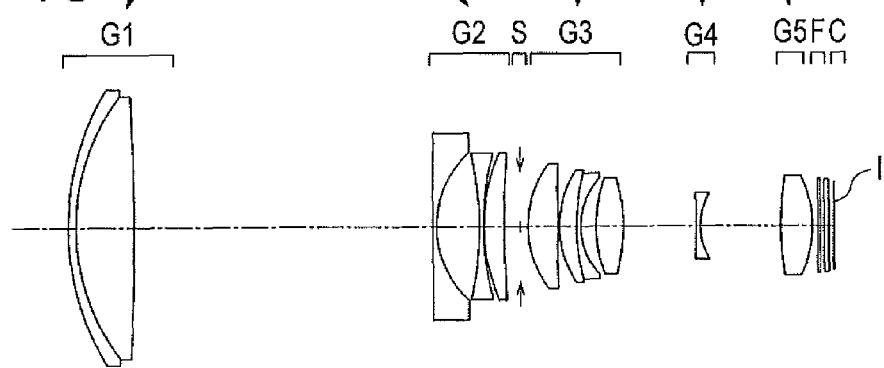
Figure 5A:
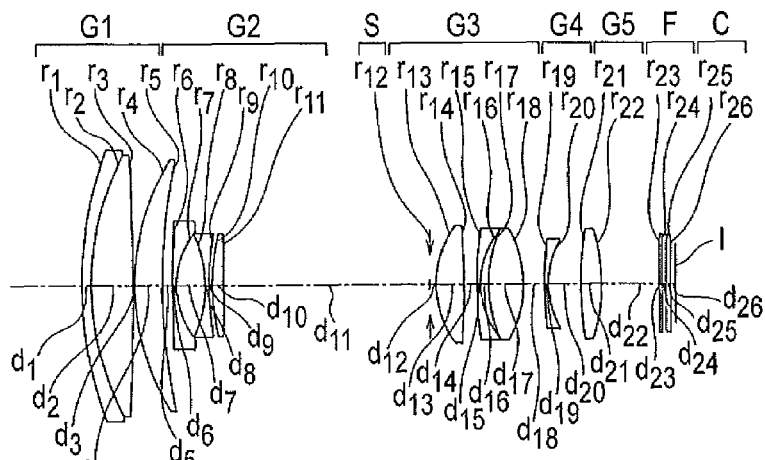
FIGS. 5A, 5B, and 5C are cross sectional views of a zoom lens according to a fifth example of the present invention taken along its optical axis, showing its configuration in the state in which the zoom lens is focused on an object point at infinity, where
Figure 5B:
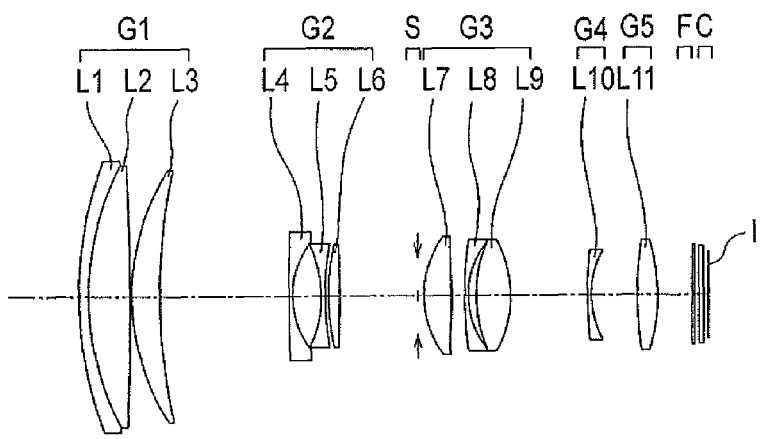
Figure 5C:
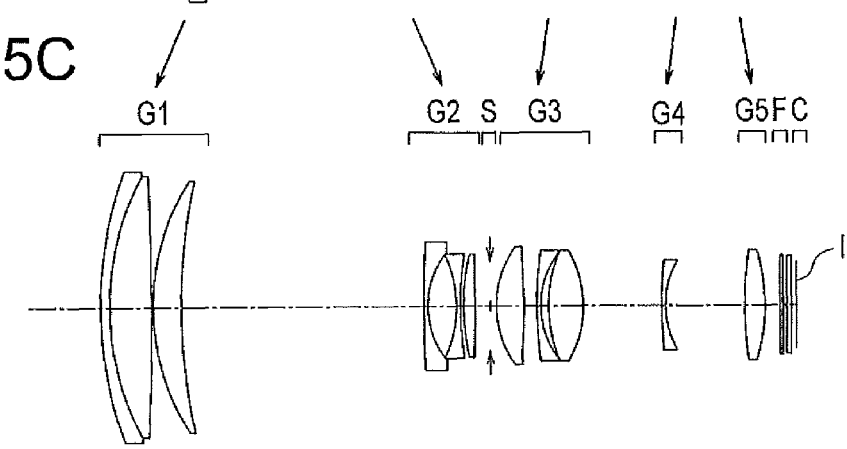

FIGS. 1A, 1B, and 1C are cross sectional views of a zoom lens according to a first example of the present invention taken along its optical axis, showing its configuration in the state in which the zoom lens is focused on an object point at infinity, where FIG. 1A shows the state at the wide angle end, FIG. 1B shows the state in an intermediate focal length state, and FIG. 1C shows the state at the telephoto end;

FIGS. 2A, 2B, and 2C are cross sectional views of a zoom lens according to a second example of the present invention taken along its optical axis, showing its configuration in the state in which the zoom lens is focused on an object point at infinity, where FIG. 2A shows the state at the wide angle end, FIG. 2B shows the state in an intermediate focal length state, and FIG. 2C shows the state at the telephoto end;

FIGS. 3A, 3B, and 3C are cross sectional views of a zoom lens according to a third example of the present invention taken along its optical axis, showing its configuration in the state in which the zoom lens is focused on an object point at infinity, where FIG. 3A shows the state at the wide angle end, FIG. 3B shows the state in an intermediate focal length state, and FIG. 3C shows the state at the telephoto end;

FIGS. 4A, 4B, and 4C are cross sectional views of a zoom lens according to a fourth example of the present invention taken along its optical axis, showing its configuration in the state in which the zoom lens is focused on an object point at infinity, where FIG. 4A shows the state at the wide angle end, FIG. 4B shows the state in an intermediate focal length state, and FIG. 4C shows the state at the telephoto end; and FIGS. 5A, 5B, and 5C are cross sectional views of a zoom lens according to a fifth example of the present invention taken along its optical axis, showing its configuration in the state in which the zoom lens is focused on an object point at infinity, where FIG. 5A shows the state at the wide angle end, FIG. 5B shows the state in an intermediate focal length state, and FIG. 5C shows the state at the telephoto end.

In FIGS. 1A to 5C, a first lens unit is denoted by G1, a second lens unit is denoted by G2, a third lens unit is denoted by G3, a fourth lens unit is denoted by G4, a fifth lens unit is denoted by G5, an aperture stop is denoted by S, a plane parallel plate constituting a low pass filter on which wavelength restriction coating for blocking or reducing infrared light is applied is denoted by F, a plane parallel plate constituting a cover glass for an electronic image pickup element is denoted by C, and the image plane is denoted by I. A multi-layer coating for wavelength restriction may be applied to the surface of the cover glass C. The cover glass C may be adapted to have a low pass filtering function. The low pass filtering effect of the plane parallel plate F may be eliminated.

In all the examples, the aperture stop S moves integrally with the third lens unit G3. All the numerical data of the examples given below is for the state in which the zoom lens is focused on an object at infinity. In the numerical data, dimensions are in millimeters and angles are in degrees. Zoom data will be given for the wide angle end (wide angle), for the intermediate focal length state (intermediate), and for the telephoto end (telephoto).

It is preferred that focusing for focus adjustment be performed by moving the fifth lens unit G5 or the fourth lens unit G4. Since the fifth lens unit G5 and the fourth lens unit G4 are light in weight, the load on the motor for driving the fifth lens unit G5 or the fourth lens unit G4 for focusing is small. Focusing may be performed by moving a lens unit other than the fifth lens unit G5 or the fourth lens unit G4. A plurality of lens units may be moved for focusing. Focusing may be performed by advancing the entirety of the lens system, or by moving one or some of the lenses forward and backward.

When a lens unit is to be shifted for image stabilization, it is preferred that the lens unit to be shifted be the third lens unit G3.

As shown in FIGS. 1A, 1B, and 1C, the zoom lens according to the first example includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

During zooming from the wide angle end to the telephoto end, the first lens unit G1 moves toward the object side, the second lens unit G2 moves toward the image side, the third lens unit G3 moves toward the object side, the fourth lens unit G4 moves first toward the image side and thereafter toward the object side, and the fifth lens unit G5 moves toward the image side. The aperture stop S moves integrally with the third lens unit G3.

The first lens unit G1 is composed of a cemented lens made up of a negative meniscus lens L1 having a convex surface directed toward the object side and a biconvex positive lens L2, and a positive meniscus lens L3 having a convex surface directed toward the object side. The second lens unit G2 is composed of a biconcave negative lens L4, a biconcave negative lens L5, and a biconvex positive lens L6. The third lens unit G3 is composed of a biconvex positive lens L7, a cemented lens made up of a positive meniscus lens L8 having a convex surface directed toward the object side and a negative meniscus lens L9 having a convex surface directed toward the object side, and a biconvex positive lens L10. The fourth lens unit G4 is composed of a negative meniscus lens L11 having a convex surface directed toward the object side. The fifth lens unit G5 is composed of a biconvex positive lens L12. The lens elements in each lens unit are arranged in the mentioned order from the object side.

There are nine aspheric surfaces, which include both surfaces of the biconcave negative lens L5, both surfaces of the biconvex positive lens L7, the image side surface of the biconvex positive lens L10, both surfaces of the negative meniscus lens L11, and both surfaces of the biconvex positive lens L12.

As shown in FIGS. 2A, 2B, and 2C, the zoom lens according to the second example includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

During zooming from the wide angle end to the telephoto end, the first lens unit G1 moves toward the object side, the second lens unit G2 moves toward the image side, the third lens unit G3 moves toward the object side, the fourth lens unit G4 moves first toward the image side and thereafter toward the object side, and the fifth lens unit G5 moves toward the image side. The aperture stop S moves integrally with the third lens unit G3.

The first lens unit G1 is composed of a cemented lens made up of a negative meniscus lens L1 having a convex surface directed toward the object side and a biconvex positive lens L2, and a positive meniscus lens L3 having a convex surface directed toward the object side. The second lens unit G2 is composed of a negative meniscus lens L4 having a convex surface directed toward the object side, a biconcave negative lens L5, and a biconvex positive lens L6. The third lens unit G3 is composed of a biconvex positive lens L7, a cemented lens made up of a positive meniscus lens L8 having a convex surface directed toward the object side and a negative meniscus lens L9 having a convex surface directed toward the object side, and a biconvex positive lens L10. The fourth lens unit G4 is composed of a biconcave negative lens L11. The fifth lens unit G5 is composed of a biconvex positive lens L12. The lens elements in each lens unit are arranged in the mentioned order from the object side.

There are five aspheric surfaces, which include the object side surface of the biconvex positive lens L6, both surfaces of the biconvex positive lens L7, the image side surface of the biconcave negative lens L11, and the image side surface of the biconvex positive lens L12.

As shown in FIGS. 3A, 3B, and 3C, the zoom lens according to the third example includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

During zooming from the wide angle end to the telephoto end, the first lens unit G1 moves first toward the image side and thereafter toward the object side, the second lens unit G2 moves toward the image side, the third lens unit G3 moves toward the object side, the fourth lens unit G4 moves toward the object side, and the fifth lens unit G5 moves toward the image side. The aperture stop S moves integrally with the third lens unit G3.

The first lens unit G1 is composed of a cemented lens made up of a negative meniscus lens L1 having a convex surface directed toward the object side and a biconvex positive lens L2, and a positive meniscus lens L3 having a convex surface directed toward the object side. The second lens unit G2 is composed of a biconcave negative lens L4, a biconcave negative lens L5, and a biconvex positive lens L6. The third lens unit G3 is composed of a biconvex positive lens L7, a cemented lens made up of a positive meniscus lens L8 having a convex surface directed toward the object side and a negative meniscus lens L9 having a convex surface directed toward the object side, and a biconvex positive lens L10. The fourth lens unit G4 is composed of a negative meniscus lens L11 having a convex surface directed toward the object side. The fifth lens unit G5 is composed of a biconvex positive lens L12. The lens elements in each lens unit are arranged in the mentioned order from the object side.

There are four aspheric surfaces, which include the image side surface of the biconcave negative lens L5, both surfaces of the biconvex positive lens L7, and the image side surface of the biconvex positive lens L12.

As shown in FIGS. 4A, 4B, and 4C, the zoom lens according to the fourth example includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

During zooming from the wide angle end to the telephoto end, the first lens unit G1 moves first toward the image side and thereafter toward the object side, the second lens unit G2 moves toward the image side, the third lens unit G3 moves toward the object side, the fourth lens unit G4 moves toward the object side, and the fifth lens unit G5 moves toward the image side. The aperture stop S moves integrally with the third lens unit G3.

The first lens unit G1 is composed of a cemented lens made up of a negative meniscus lens L1 having a convex surface directed toward the object side and a biconvex positive lens L2. The second lens unit G2 is composed of a negative meniscus lens L3 having a convex surface directed toward the object side, a biconcave negative lens L4, and a positive meniscus lens L5 having a convex surface directed toward the object side. The third lens unit G3 is composed of a biconvex positive lens L6, a cemented lens made up of a positive meniscus lens L7 having a convex surface directed toward the object side and a negative meniscus lens L8 having a convex surface directed toward the object side, and a biconvex positive lens L9. The fourth lens unit G4 is composed of a biconcave negative lens L10. The fifth lens unit G5 is composed of a biconvex positive lens L11. The lens elements in each lens unit are arranged in the mentioned order from the object side.

There are six aspheric surfaces, which include the image side surface of the biconvex positive lens L2, the object side surface of a biconcave negative lens L4, both surfaces of the biconvex positive lens L6, and both surfaces of the biconvex positive lens L11.

As shown in FIGS. 5A, 5B, and 5C, the zoom lens according to the fifth example includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

During zooming from the wide angle end to the telephoto end, the first lens unit G1 moves toward the object side, the second lens unit G2 moves toward the image side, the third lens unit G3 moves toward the object side, the fourth lens unit G4 moves first toward the image side and thereafter toward the object side, and the fifth lens unit G5 moves toward the image side. The aperture stop S moves integrally with the third lens unit G3.

The first lens unit G1 is composed of a cemented lens made up of a negative meniscus lens L1 having a convex surface directed toward the object side and a biconvex positive lens L2, and a positive meniscus lens L3 having a convex surface directed toward the object side. The second lens unit G2 is composed of a negative meniscus lens L4 having a convex surface directed toward the object side, a biconcave negative lens L5, and a biconvex positive lens L6. The third lens unit G3 is composed of a biconvex positive lens L7, a negative meniscus lens L8 having a convex surface directed toward the object side, and a biconvex positive lens L9. The fourth lens unit G4 is composed of a negative meniscus lens L10 having a convex surface directed toward the object side. The fifth lens unit G5 is composed of a biconvex positive lens L11. The lens elements in each lens unit are arranged in the mentioned order from the object side.

There are five aspheric surfaces, which include the object side surface of the biconvex positive lens L6, both surfaces of the biconvex positive lens L7, the image side surface of the negative meniscus lens L10, and the image side surface of the biconvex positive lens L11.

Numerical data of each embodiment described above is shown below. Apart from symbols described above, fb denotes a back focus, f1, f2, ... denotes a focal length of each lens unit, Fno denotes an F number, ω denotes a half image angle, WE denotes a wide angle end, ST denotes an intermediate state, TE denotes a telephoto end, r denotes radius of curvature of each lens surface, d denotes a distance between two lenses, nd denotes a refractive index of each lens for a d-line, and vd denotes an Abbe's number for each lens. The overall length of the lens system which will be described later is a length which is obtained by adding the back focus to a distance from the first lens surface up to the last lens surface. fb (back focus) is a unit which is expressed upon air conversion of a distance from the last lens surface up to a paraxial image plane.

A shape of the aspheric surface is described by the following expression (I) using each aspherical surface coefficient in each embodiment, when Z is let to be a coordinate point on an optical axis, and Y is let to be a coordinate point on a direction orthogonal to the optical axis, $$Z=(Y^2/r)/[1+\{1-(K+1)(Y/r)^2\}^{1/2}]+A_4Y^4+A_6Y^6+A_8Y^8+A_{10}Y^{10} \quad (I)$$

where, r denotes a paraxial radius of curvature, K denotes a conical coefficient, $A_4$, $A_6$, $A_8$, and $A_{10}$ denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

Example 1

| | Unit mm Surface data | | | |
|---|---|---|---|---|
| Surface no. | r | d | nd | vd |
| 1 | 46.380 | 1.10 | 1.84666 | 23.78 |
| 2 | 34.460 | 4.50 | 1.49700 | 81.54 |
| 3 | −733.704 | 0.18 | | |
| 4 | 30.693 | 2.68 | 1.49700 | 81.54 |
| 5 | 73.339 | Variable | | |
| 6 | −232.961 | 0.40 | 1.88300 | 40.76 |
| 7 | 9.734 | 4.14 | | |
| 8* | −18.836 | 0.50 | 1.74156 | 49.21 |
| 9* | 137.632 | 0.10 | | |
| 10 | 34.325 | 1.71 | 1.94595 | 17.98 |
| 11 | −69.795 | Variable | | |
| 12 (stop) | ∞ | 0.00 | | |
| 13* | 9.782 | 3.00 | 1.74156 | 49.21 |
| 14* | −123.245 | 0.10 | | |
| 15 | 12.882 | 2.24 | 1.59282 | 68.63 |
| 16 | 36.663 | 0.50 | 1.84666 | 23.78 |
| 17 | 7.155 | 1.75 | | |
| 18 | 18.641 | 1.96 | 1.58233 | 59.30 |
| 19* | −23.188 | Variable | | |
| 20* | 118.843 | 0.50 | 1.53071 | 55.69 |
| 21* | 11.107 | Variable | | |
| 22* | 80.000 | 1.69 | 1.53071 | 55.69 |
| 23* | −16.169 | Variable | | |
| 24 | ∞ | 0.30 | 1.51633 | 64.14 |
| 25 | ∞ | 0.59 | | |
| 26 | ∞ | 0.50 | 1.51633 | 64.14 |
| 27 | ∞ | 0.53 | | |
| Image plane (Light receiving surface) | ∞ | | | |

| Aspherical surface data |
|---|

8th surface

K = 0.000
A4 = 3.46605e−05, A6 = −4.20407e−07
9th surface

K = 0.000
A4 = −3.63877e−06, A6 = −5.38516e−07
13th surface

K = 0.000
A4 = −9.77271e−05, A6 = −3.43776e−07, A8 = −3.77130e−09
14th surface

K = 0.000
A4 = 7.41385e−05, A6 = −4.92054e−07, A8 = 6.96740e−09
19th surface

K = 0.000
A4 = 2.32344e−06
20th surface

K = 0.000
A4 = −1.29535e−05
21th surface

K = 0.000
A4 = 5.60767e−05
22th surface

K = 0.000
A4 = −1.59700e−04, A6 = 1.49990e−06
23th surface

K = 0.000
A4 = −5.51926e−05, A6 = 1.57462e−06, A8 = −1.18405e−08

-continued

Zoom data

| | WE | ST | TE |
|---|---|---|---|
| Focal length | 6.10 | 18.56 | 62.92 |
| Fno. | 2.80 | 2.80 | 2.85 |
| Angle of field 2ω | 76.12 | 27.42 | 8.18 |
| fb (in air) | 8.07 | 5.69 | 4.36 |
| Lens total length (in air) | 68.02 | 70.48 | 79.74 |
| d5 | 0.99 | 15.88 | 31.89 |
| d11 | 27.98 | 11.23 | 2.28 |
| d19 | 1.29 | 5.68 | 4.81 |
| d21 | 2.63 | 4.96 | 9.34 |
| d23 | 6.41 | 4.02 | 2.69 |

Unit focal length

| | | | | |
|---|---|---|---|---|
| f1 = 54.84 | f2 = −10.41 | f3 = 12.83 | f4 = −23.11 | f5 = 25.48 |

Example 2

Unit mm
Surface data

| Surface no. | r | d | nd | νd |
|---|---|---|---|---|
| 1 | 42.307 | 1.00 | 1.84666 | 23.78 |
| 2 | 30.737 | 4.28 | 1.49700 | 81.54 |
| 3 | −401.369 | 0.18 | | |
| 4 | 26.342 | 2.83 | 1.49700 | 81.54 |
| 5 | 65.920 | Variable | | |
| 6 | 116.602 | 0.40 | 1.88300 | 40.76 |
| 7 | 8.895 | 3.15 | | |
| 8 | −12.156 | 0.40 | 1.77250 | 49.60 |
| 9 | 36.438 | 0.25 | | |
| 10* | 24.562 | 1.21 | 2.10300 | 18.05 |
| 11 | −110.435 | Variable | | |
| 12 (stop) | ∞ | 0.66 | | |
| 13* | 11.124 | 3.08 | 1.72903 | 54.04 |
| 14* | −32.464 | 0.12 | | |
| 15 | 18.451 | 1.81 | 1.51633 | 64.14 |
| 16 | 45.329 | 0.71 | 1.84666 | 23.78 |
| 17 | 9.344 | 1.14 | | |
| 18 | 21.264 | 3.34 | 1.49700 | 81.54 |
| 19 | −11.666 | Variable | | |
| 20 | −226.200 | 0.40 | 1.53071 | 55.60 |
| 21* | 8.496 | Variable | | |
| 22 | 21.305 | 2.40 | 1.53071 | 55.60 |
| 23* | −19.973 | Variable | | |
| 24 | ∞ | 0.30 | 1.51633 | 64.14 |
| 25 | ∞ | 0.40 | | |
| 26 | ∞ | 0.50 | 1.51633 | 64.14 |
| 27 | ∞ | 0.53 | | |
| Image plane (Light receiving surface) | | | | |

Aspherical surface data

10th surface

K = 0.000
A4 = −1.13920e−05, A6 = −2.03573e−07
13th surface

K = 0.000
A4 = −8.31293e−05, A6 = 5.94132e−07
14th surface

K = 0.000
A4 = 1.87727e−04, A6 = 2.01285e−07
21th surface

K = 0.000
A4 = 1.93076e−05

23th surface

K = 0.000
A4 = 3.46753e−05, A6 = −1.57350e−06, A8 = 5.60450e−09

Zoom data

| | WE | ST | TE |
|---|---|---|---|
| Focal length | 6.07 | 19.63 | 63.12 |
| Fno. | 2.83 | 2.84 | 2.84 |
| Angle of field 2ω | 77.37 | 25.82 | 8.08 |
| fb (in air) | 8.14 | 5.39 | 3.15 |
| Lens total length (in air) | 63.30 | 66.04 | 74.48 |
| d5 | 1.00 | 13.85 | 26.11 |
| d11 | 22.02 | 7.85 | 1.62 |
| d19 | 1.24 | 6.79 | 7.84 |
| d21 | 3.54 | 4.79 | 8.40 |
| d23 | 6.66 | 3.90 | 1.66 |

Unit focal length

| | | | | |
|---|---|---|---|---|
| f1 = 47.05 | f2 = −8.00 | f3 = 11.39 | f4 = −15.42 | f5 = 19.82 |

Example 3

Unit mm
Surface data

| Surface no. | r | d | nd | νd |
|---|---|---|---|---|
| 1 | 38.959 | 0.83 | 1.92286 | 20.88 |
| 2 | 27.869 | 4.00 | 1.49700 | 81.61 |
| 3 | −351.994 | 0.15 | | |
| 4 | 21.575 | 2.40 | 1.59282 | 68.63 |
| 5 | 71.413 | Variable | | |
| 6 | −172.991 | 0.40 | 1.88300 | 40.76 |
| 7 | 9.158 | 3.20 | | |
| 8 | −17.425 | 0.40 | 1.74330 | 49.33 |
| 9* | 19.511 | 0.30 | | |
| 10 | 19.020 | 1.65 | 1.94595 | 17.98 |
| 11 | −130.076 | Variable | | |
| 12 (stop) | ∞ | 0.66 | | |
| 13* | 10.945 | 2.58 | 1.74330 | 49.33 |
| 14* | −36.192 | 0.10 | | |
| 15 | 10.654 | 1.70 | 1.51633 | 64.14 |
| 16 | 36.952 | 0.40 | 1.80810 | 22.76 |
| 17 | 7.957 | 1.70 | | |
| 18 | 64.297 | 1.96 | 1.49700 | 81.54 |
| 19 | −11.420 | Variable | | |
| 20 | 200.000 | 0.40 | 1.51633 | 64.14 |
| 21 | 8.050 | Variable | | |
| 22 | 41.283 | 2.00 | 1.53071 | 55.60 |
| 23* | −14.148 | Variable | | |
| 24 | ∞ | 0.30 | 1.51633 | 64.14 |
| 25 | ∞ | 0.40 | | |
| 26 | ∞ | 0.50 | 1.51633 | 64.14 |
| 27 | ∞ | 0.53 | | |
| Image plane (Light receiving surface) | ∞ | | | |

Aspherical surface data

9th surface

K = 0.000
A4 = −3.95226e−05, A6 = 3.66462e−07
13th surface

K = 0.000
A4 = −6.71053e−05, A6 = 4.99533e−07, A8 = −1.73747e−09
14th surface

K = 0.000
A4 = 1.98622e−04

-continued

23th surface

K = 0.000
A4 = 3.86035e−04, A6 = −3.40258e−07, A8 = −3.89880e−08

Zoom data

|  | WE | ST | TE |
|---|---|---|---|
| Focal length | 5.04 | 16.25 | 52.41 |
| Fno. | 2.85 | 2.85 | 2.84 |
| Angle of field 2ω | 76.78 | 25.51 | 7.99 |
| fb (in air) | 5.64 | 4.18 | 2.73 |
| Lens total length (in air) | 63.21 | 60.35 | 61.26 |
| d5 | 0.84 | 9.68 | 17.33 |
| d11 | 26.87 | 10.97 | 1.35 |
| d19 | 2.25 | 4.97 | 6.32 |
| d21 | 2.79 | 5.73 | 8.71 |
| d23 | 4.17 | 2.71 | 1.30 |

Unit focal length f1 = 34.60   f2 = −7.81   f3 = 11.09   f4 = −16.26   f5 = 20.11

Example 4

Unit mm
Surface data

| Surface no. | r | d | nd | vd |
|---|---|---|---|---|
| 1 | 28.506 | 0.80 | 1.84666 | 23.78 |
| 2 | 23.303 | 6.00 | 1.49700 | 81.54 |
| 3* | −204.148 | Variable | | |
| 4 | 756.690 | 0.40 | 1.88300 | 40.76 |
| 5 | 10.501 | 4.50 | | |
| 6* | −32.838 | 0.40 | 1.74320 | 49.34 |
| 7 | 28.837 | 0.10 | | |
| 8 | 20.002 | 2.10 | 1.94595 | 17.98 |
| 9 | 115.191 | Variable | | |
| 10 (stop) | ∞ | 0.80 | | |
| 11* | 10.793 | 3.10 | 1.74320 | 49.34 |
| 12* | −116.505 | 0.15 | | |
| 13 | 11.023 | 1.75 | 1.51633 | 64.14 |
| 14 | 21.086 | 0.45 | 1.80810 | 22.76 |
| 15 | 7.460 | 1.60 | | |
| 16 | 14.808 | 2.80 | 1.49700 | 81.54 |
| 17 | −17.892 | Variable | | |
| 18 | −106.972 | 0.45 | 1.51633 | 64.14 |
| 19 | 6.455 | Variable | | |
| 20* | 27.027 | 3.30 | 1.49700 | 81.54 |
| 21* | −11.885 | Variable | | |
| 22 | ∞ | 0.30 | 1.51633 | 64.14 |
| 23 | ∞ | 0.40 | | |
| 24 | ∞ | 0.50 | 1.51633 | 64.14 |
| 25 | ∞ | 0.53 | | |
| Image plane (Light receiving surface) | ∞ | | | |

Aspherical surface data

3rd surface

K = 0.000
A4 = 3.37875e−06, A6 = −1.49575e−09
6th surface

K = 0.000
A4 = 1.24551e−05, A6 = 8.70362e−08
11th surface

K = 0.000
A4 = −4.07065e−05

-continued

12th surface

K = 0.000
A4 = 1.24748e−04
20th surface

K = 0.000
A4 = −1.46734e−04
21th surface

K = 0.000
A4 = 8.52527e−05, A6 = −4.72599e−06

Zoom data

|  | WE | ST | TE |
|---|---|---|---|
| Focal length | 5.23 | 18.12 | 62.92 |
| Fno. | 2.85 | 2.85 | 2.85 |
| Angle of field 2ω | 82.88 | 27.25 | 8.08 |
| fb (in air) | 5.97 | 4.76 | 2.03 |
| Lens total length (in air) | 76.95 | 73.14 | 79.43 |
| d3 | 0.30 | 16.56 | 31.09 |
| d9 | 37.01 | 12.75 | 1.65 |
| d17 | 2.01 | 5.11 | 7.54 |
| d19 | 2.96 | 5.25 | 8.42 |
| d21 | 4.47 | 3.29 | 0.55 |

Unit focal length f1 = 58.31   f2 = −10.47   f3 = 11.94   f4 = −11.77   f5 = 17.08

Example 5

Unit mm
Surface data

| Surface no. | r | d | nd | vd |
|---|---|---|---|---|
| 1 | 42.309 | 1.00 | 1.84666 | 23.78 |
| 2 | 30.655 | 4.41 | 1.49700 | 81.54 |
| 3 | −315.262 | 0.18 | | |
| 4 | 25.604 | 2.96 | 1.49700 | 81.54 |
| 5 | 63.431 | Variable | | |
| 6 | 204.249 | 0.40 | 1.88300 | 40.76 |
| 7 | 9.295 | 3.07 | | |
| 8 | −13.077 | 0.40 | 1.77250 | 49.60 |
| 9 | 32.863 | 0.35 | | |
| 10* | 23.126 | 1.21 | 2.10300 | 18.05 |
| 11 | −218.634 | Variable | | |
| 12 (stop) | ∞ | 0.66 | | |
| 13* | 10.479 | 2.95 | 1.76802 | 49.24 |
| 14* | −44.326 | 1.37 | | |
| 15 | 42.445 | 0.40 | 1.84666 | 23.78 |
| 16 | 9.322 | 0.84 | | |
| 17 | 15.027 | 3.64 | 1.49700 | 81.54 |
| 18 | −12.418 | Variable | | |
| 19 | 47.678 | 0.40 | 1.53071 | 55.60 |
| 20* | 9.948 | Variable | | |
| 21 | 39.823 | 2.18 | 1.53071 | 55.60 |
| 22* | −19.956 | Variable | | |
| 23 | ∞ | 0.30 | 1.51633 | 64.14 |
| 24 | ∞ | 0.40 | | |
| 25 | ∞ | 0.50 | 1.51633 | 64.14 |
| 26 | ∞ | 0.53 | | |
| Image plane (Light receiving surface) | ∞ | | | |

-continued

Aspherical surface data

10th surface

K = 0.000
A4 = −1.43277e−05, A6 = −2.93628e−07

13th surface

K = 0.000
A4 = −8.11392e−05, A6 = 4.69104e−07

14th surface

K = 0.000
A4 = 1.73834e−04

20th surface

K = 0.000
A4 = 9.08553e−05

22th surface

K = 0.000
A4 = 6.54949e−05, A6 = −3.14591e−06, A8 = 4.77055e−08

Zoom data

|  | WE | ST | TE |
| --- | --- | --- | --- |
| Focal length | 6.07 | 19.53 | 63.12 |
| Fno. | 2.83 | 2.87 | 2.80 |
| Angle of field 2ω | 77.63 | 26.02 | 8.08 |
| fb (in air) | 7.64 | 5.13 | 3.05 |
| Lens total length (in air) | 62.79 | 66.56 | 73.63 |
| d5 | 1.14 | 13.75 | 25.87 |
| d11 | 21.95 | 8.33 | 1.62 |
| d18 | 2.23 | 8.06 | 8.27 |
| d20 | 3.43 | 4.89 | 8.42 |
| d22 | 6.15 | 3.65 | 1.58 |

Unit focal length

| f1 = 45.81 | f2 = −8.09 | f3 = 12.13 | f4 = −23.77 | f5 = 25.37 |
| --- | --- | --- | --- | --- |

FIGS. 6A to 6L, 7A to 7L, 8A to 8L, 9A to 9L, and 10A to 10L respectively show aberrations of the zoom lenses according to the first to fifth examples in the state in which the zoom lenses are focused on an object point at infinity.

FIGS. 6A to 6L are aberration diagrams of the zoom lens according to the first example in the state in which the zoom lens is focused on an object point at infinity. FIGS. 6A, 6B, 6C, and 6D respectively show spherical aberration (SA), astigmatism (AS), distortion (DT), and chromatic aberration of magnification (CC) at the wide angle end. FIGS. 6E, 6F, 6G, and 6H respectively show spherical aberration, astigmatism, distortion, and chromatic aberration of magnification of the zoom lens in the intermediate focal length state. FIGS. 6I, 6J, 6K, and 6L respectively show spherical aberration, astigmatism, distortion, and chromatic aberration of magnification of the zoom lens at the telephoto end.

FIGS. 7A to 7L are aberration diagrams of the zoom lens according to the second example in the state in which the zoom lens is focused on an object point at infinity. FIGS. 7A, 7B, 7C, and 7D respectively show spherical aberration, astigmatism, distortion, and chromatic aberration of magnification of the zoom lens at the wide angle end. FIGS. 7E, 7F, 7G, and 7H respectively show spherical aberration, astigmatism, distortion, and chromatic aberration of magnification of the zoom lens in the intermediate focal length state. FIGS. 7I, 7J, 7K, and 7L respectively show spherical aberration, astigmatism, distortion, and chromatic aberration of magnification of the zoom lens at the telephoto end.

FIGS. 8A to 8L are aberration diagrams of the zoom lens according to the third example in the state in which the zoom lens is focused on an object point at infinity. FIGS. 8A, 8B, 8C, and 8D respectively show spherical aberration, astigmatism, distortion, and chromatic aberration of magnification of the zoom lens at the wide angle end. FIGS. 8E, 8F, 8G, and 8H respectively show spherical aberration, astigmatism, distortion, and chromatic aberration of magnification of the zoom lens in the intermediate focal length state. FIGS. 8I, 8J, 8K, and 8L respectively show spherical aberration, astigmatism, distortion, and chromatic aberration of magnification of the zoom lens at the telephoto end.

FIGS. 9A to 9L are aberration diagrams of the zoom lens according to the fourth example in the state in which the zoom lens is focused on an object point at infinity. FIGS. 9A, 9B, 9C, and 9D respectively show spherical aberration, astigmatism, distortion, and chromatic aberration of magnification of the zoom lens at the wide angle end. FIGS. 9E, 9F, 9G, and 9H respectively show spherical aberration, astigmatism, distortion, and chromatic aberration of magnification of the zoom lens in the intermediate focal length state. FIGS. 9I, 9J, 9K, and 9L respectively show spherical aberration, astigmatism, distortion, and chromatic aberration of magnification of the zoom lens at the telephoto end.

FIGS. 10A to 10L are aberration diagrams of the zoom lens according to the fifth example in the state in which the zoom lens is focused on an object point at infinity. FIGS. 10A, 10B, 10C, and 10D respectively show spherical aberration, astigmatism, distortion, and chromatic aberration of magnification of the zoom lens at the wide angle end. FIGS. 10E, 10F, 10G, and 10H respectively show spherical aberration, astigmatism, distortion, and chromatic aberration of magnification of the zoom lens in the intermediate focal length state. FIGS. 10I, 10J, 10K, and 10L respectively show spherical aberration, astigmatism, distortion, and chromatic aberration of magnification of the zoom lens at the telephoto end. In aberration diagrams, ω represents the half angle of view.

Next, parameter and values of conditional expressions in each embodiments are described.

|  | conditional expression | Example 1 | Example 2 | Example 3 | Example 4 | Example 5 |
| --- | --- | --- | --- | --- | --- | --- |
| (1) | ft/fw | 10.31 | 10.39 | 10.41 | 12.03 | 10.40 |
| (2) | Fno (T) | 2.85 | 2.84 | 2.84 | 2.85 | 2.80 |
| (3) | Σd/ft | 0.43 | 0.42 | 0.46 | 0.44 | 0.41 |
| (4) | Δ2G/|Δ3G| | 2.94 | 2.15 | 2.60 | 4.02 | 2.16 |
| (5) | Δ2G/Lt | 0.24 | 0.19 | 0.30 | 0.36 | 0.19 |
| (6) | |Δ3G|/Lt | 0.08 | 0.09 | 0.12 | 0.09 | 0.09 |
| (7) | (β2T/β2w)/(ft/fw) | 0.47 | 0.40 | 0.37 | 0.30 | 0.45 |
| (8) | (β3T/β3w)/(ft/fw) | 0.17 | 0.20 | 0.21 | 0.22 | 0.18 |
| (9) | |f2|/ft | 0.17 | 0.13 | 0.15 | 0.17 | 0.13 |
| (10) | f3/ft | 0.20 | 0.18 | 0.21 | 0.19 | 0.19 |
| (11) | f5/ft | 0.40 | 0.31 | 0.38 | 0.27 | 0.40 |

A flare stop may be provided in addition to the aperture stop in order to eliminate unwanted light that may cause ghost images, lens flare or the like. The flare stop may be disposed on the object side of the first lens unit, between the first lens unit and the second lens unit, between the second lens unit and the third lens unit, between the third lens unit and the fourth lens unit, between the fourth lens unit and the fifth lens unit, or between the fifth lens unit and the image plane. A frame member may be adapted to cut rays that may cause lens flare, or an additional part may be provided for this purpose. Alternatively, a flare stop may be provided on an optical component in the optical system by direct printing or painting, or by attaching a sticker. The aperture of the flare stop may have a circular, elliptical, rectangular, polygonal, or other shape, or the shape of the aperture may be defined by a curve expressed by a mathematical function. The flare stop may be adapted to cut not only detrimental beams but also beams that may cause coma flare etc. in the peripheral region of the image.

Anti-reflection coating may be applied to each lens to reduce ghost images and lens flare. It is desirable that the coating be multi-layer coating, which can effectively reduce ghost images and lens flare. Infrared cut coating may be applied to surfaces of lenses and cover glasses.

Anti-reflection coating applied to the surfaces of lenses exposed to air is widely used to prevent ghost images and lens flare. The refractive indices of adhesives used on the cemented surfaces of cemented lenses are significantly higher than the refractive index of air. Consequently, the reflectivities of the cemented surfaces areas low as or lower than surfaces having single-layer coating in many cases. Therefore, anti-reflection coating is rarely applied to the cemented surfaces of cemented lenses. However, anti-reflection coating may be applied on the cemented surfaces. This will further reduce ghost images and lens flare, and better images can be obtained consequently.

Lens materials having high refractive indices are prevailing and widely used in camera optical systems in recent times, because they are advantageous in correcting aberrations. However, when a lens material having a high refractive index is used in an element of a cemented lens, reflection on the cemented surface cannot be ignored. In such cases, it is particularly effective to apply anti-reflecting coating on the cemented surface.

Effective use of coating on cemented surfaces is disclosed in, for example, Japanese Patent Application Laid-Open No. 2-27301, Japanese Patent Application Laid-Open No. 2001-324676, Japanese Patent Application Laid-Open No. 2005-92115, and U.S. Pat. No. 7,116,482. The zoom lenses disclosed in these patent documents are positive-lead type zoom lenses, and these documents describe coating on cemented lens surfaces in the first lens unit. The cemented lens surface in the first lens unit G1 having a positive refractive power in the embodiment of the present invention may be coated in a manner according to these documents. The coating material may be selected appropriately based on the refractive index of the base lens and the refractive index of the adhesive. A coating material having a relatively high refractive power such as $Ta_2O_5$, $TiO_2$, $Nb_2O_5$, $ZrO_2$, $HfO_2$, $CeO_2$, $SnO_2$, $In_2O_3$, $ZnO$, or $Y_2O_3$ or a coating material having a relatively low refractive power such as $MgF_2$, $SiO_2$ or $Al_2O_3$ may be chosen fitly, and the coating film thickness may be set appropriately to meet the phase condition.

Coating on the cemented surface may be multi-layer coating as with coating on lens surfaces in contact with air. By using two or more layers of coating materials in combination and selecting the film thickness of each coating layer appropriately, the reflectance can further be reduced and spectral characteristics and angular characteristics of reflectance can be controlled.

It is effective to apply coating also to cemented surfaces in lens units other than the first lens unit G1 for the same reason.

Figure 11:
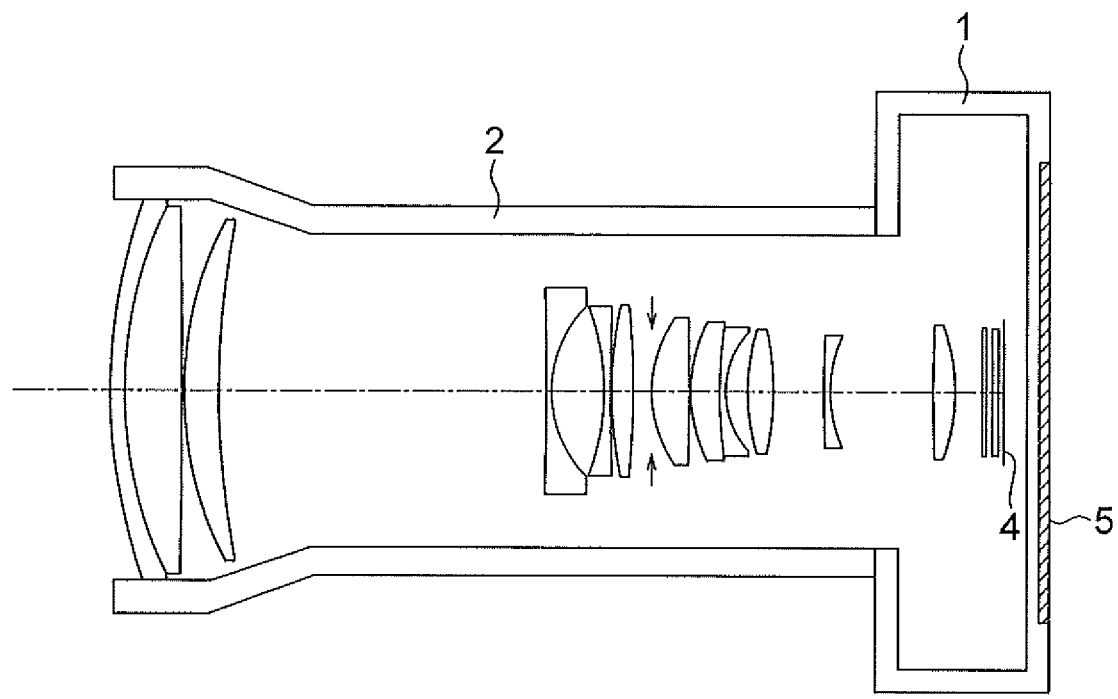
FIG. 11 is a cross-sectional view of a compact camera as an image pickup apparatus using small CCD or CMOS as an image pickup element, in which the zoom lens according to the present invention is incorporated.

FIG. 11 is a cross-sectional view of a compact camera 1 as an image pickup apparatus in which, the zoom lens according to the present invention is used, and a small-size CCD (charge coupled device) or a CMOS (complementary metal oxide semiconductor) is used. An image pickup lens system 2 is disposed inside a lens barrel of the compact camera 1, and an image pickup element surface 4 and a back monitor 5 are disposed inside a camera body.

Here, it is also possible to let the image pickup lens system 2 to be detachable from a single-lens mirrorless camera by providing a mounting portion to the lens barrel. As the mounting portion, for example, a screw type mount or a bayonet type mount could be used.

The zoom lens described in the embodiments from the first embodiment to the fifth embodiment is to be used as the image pickup lens system 2 of the compact camera 1 having such structure.

Figure 12:
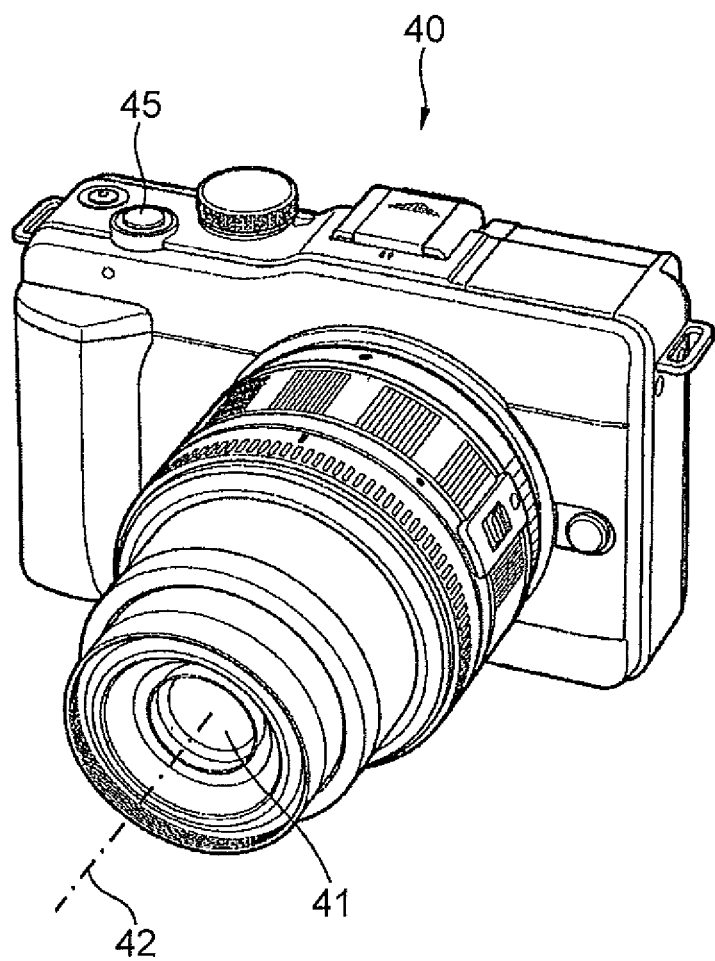
FIG. 12 is a front perspective view showing an appearance of a digital camera as an image pickup apparatus.
Figure 13:
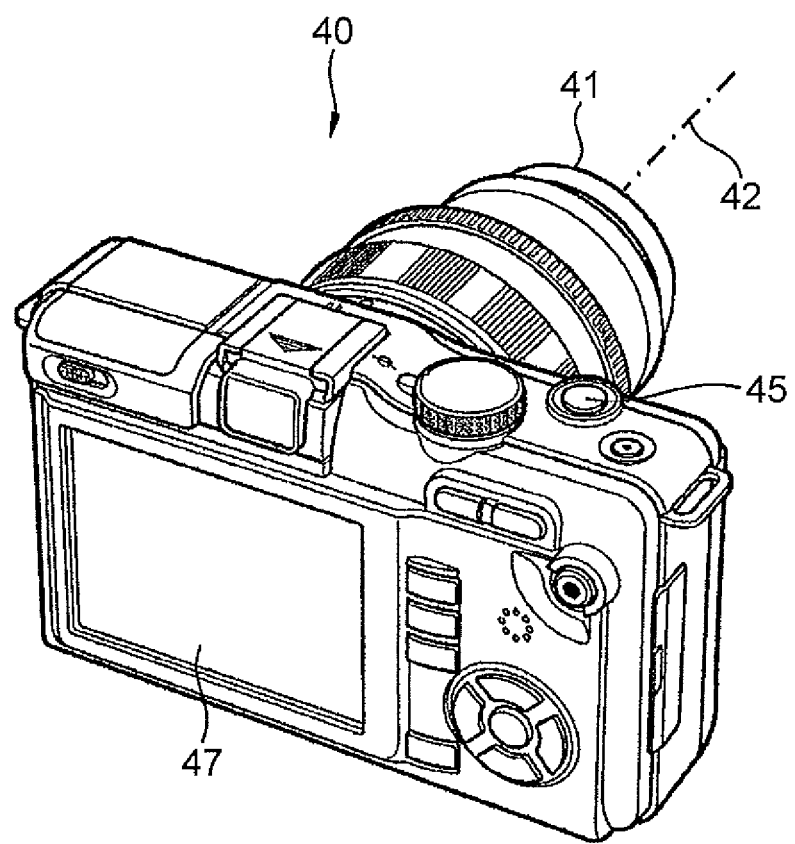
FIG. 13 is a rear perspective view showing an appearance of the digital camera.

FIG. 12 and FIG. 13 show conceptual diagrams of a structure of the image pickup apparatus according to the present invention in which, the zoom lens has been incorporated in a photographic optical system 41. FIG. 12 is a front perspective view showing an appearance of a digital camera 40 as an image pickup apparatus, and FIG. 13 is a rear perspective view showing an appearance of the digital camera 40.

The digital camera 40 according to the embodiment includes the photographic optical system 41 positioned on a capturing optical path 42, a shutter button 45, and a liquid-crystal display monitor 47. When the shutter button 45 disposed on an upper portion of the digital camera 40 is pressed, in conjunction with the pressing of the shutter button 45, an image is captured through the photographic optical system 41 such as the zoom lens according to the first embodiment. An object image which has been formed by the photographic optical system 41 is formed on an image pickup element (photoelectric conversion surface) provided near an image forming surface. The object image which has been received by the image pickup element is displayed as an electronic image on the liquid-crystal display monitor 47 provided on a rear surface of the digital camera 40 by a processing unit. Moreover, it is possible to record the electronic image which has been captured in a recording unit.

(Internal Circuit Structure)

Figure 14:
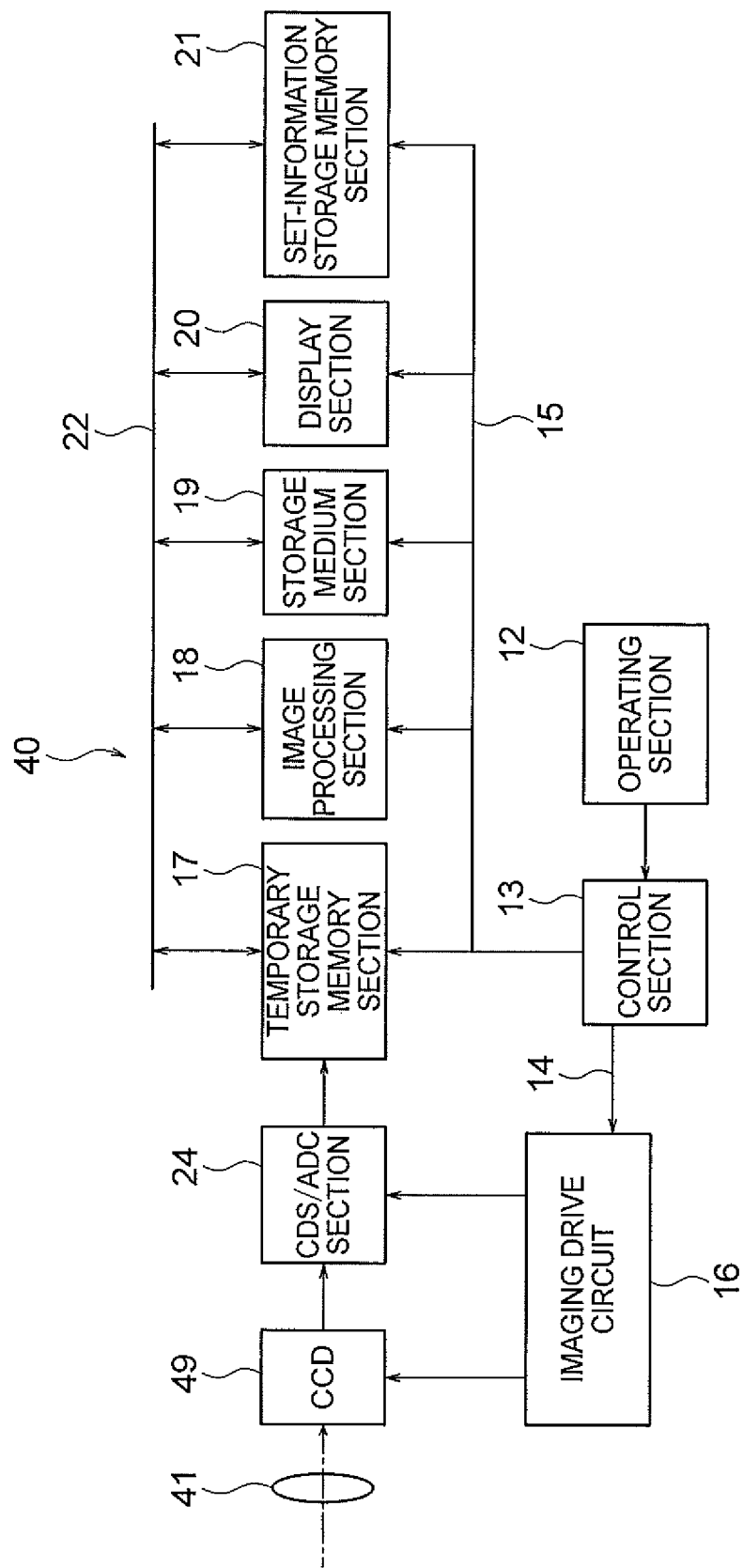
FIG. 14 is a block diagram showing an internal circuit of main components of the digital camera.

FIG. 14 is a block diagram showing an internal circuit of main components of the digital camera 40. In the following description, the processing unit mentioned above includes components such as CDS/ADC section 24, a temporary storage memory section 17, and an image processing section 18. A storage unit includes a storage medium.

As shown in FIG. 14, the digital camera 40 includes an operating section 12, a control section 13 which is connected to the operating section 12, an imaging drive circuit 16 which is connected to a control-signal output port of the control section 13 via buses 14 and 15, the temporary storage memory section 17, the image processing section 18, a storage medium section 19, a display section 20, and a set-information storage memory section 21.

The temporary storage memory section 17, the image processing section 18, the storage medium section 19, the display section 20, and the set-information storage memory section 21 are capable of inputting and outputting data mutually via a bus 22. Moreover, a CCD 49 and the CDS/ADC section 24 are connected to the imaging drive circuit 16.

The operating section 12 includes various input buttons and switches, and imparts event information input from outside (user of camera) via the input buttons and switches to the control section 13. The control section 13 is a central arithmetic processing unit such as a CPU with a built-in program memory which is not shown in the diagram, and controls the overall digital camera 40 according to a computer program which has been stored in the computer program memory.

The CCD 49 is an image pickup element which is driven and controlled by the imaging drive circuit 16, and which converts an amount of light for each pixel of the object image which has been formed through the image pickup optical system 41 to an electric signal, and outputs to the CDS/ADC section 24.

The CDS/ADC section 24 is a circuit which amplifies the electric signal input from the CCD 49, and also carries out analog-to-digital conversion, and outputs image raw-data only for the amplification and digital conversion carried out (bayer data, hereinafter called as 'RAW data').

The temporary storage memory section 17 is a buffer such as a SDRAM, and is a memory unit which temporarily stores the RAW data output put from the CDS/ADC section 24. The image processing section 18 is a circuit which reads the RAW data which has been stored in the temporary storage memory section 17 or the RAW data which has been stored in the storage medium section 19, and carries out electrically, various image processing including a distortion correction based on image-quality parameters which have been specified by the control section 13.

The recording medium section 19 in which, a recording medium in the form of a stick or a card with a flash memory is detachably mounted, records and maintains the RAW data which is transferred from the temporary storage memory section 17 and image data which has been subjected to image processing in the image processing section 18.

The display section 20 includes the liquid-crystal display monitor 47 and displays operation menu, image data, and RAW data captured. The set-information storage memory section 21 is provided with a ROM section in which various image-quality parameters are stored in advance, and a RAM section which stores the image-quality parameters which have been read from the ROM section by an input and output operation of the operating section 12.

The digital camera 40 which is structured in such manner, by adopting the zoom lens according to the present invention as the photographic optical system 41, enables zooming, and enables setting of a first mode which enables focusing including up to infinity and a second mode in which it is possible to achieve substantial (high) magnification, thereby making it possible to let to be an image pickup apparatus which is advantageous for both small-sizing and improved performance.

The zoom lens and the image pickup apparatus equipped with the same according to the present invention are useful when high zoom ratio, excellent optical performance, and small size are to be achieved.

The present invention can provide a zoom lens that has a high zoom ratio as high as or higher than 6 and excellent performance with high speed throughout the focal length range from the wide angle end to the telephoto end and well-corrected aberrations, while being compact with small overall length (when in use and in the collapsed state).

What is claimed is:

1. A zoom lens consisting of, in order from the object side:
a first lens unit having a positive refractive power;
a second lens unit having a negative refractive power;
a third lens unit having a positive refractive power;
a fourth lens unit having a negative refractive power; and
a fifth lens unit having a positive refractive power, wherein the first lens unit and the fifth lens unit move during zooming from the wide angle end to the telephoto end, and
the following conditional expressions (1), (2), and (3) are satisfied:

$$f_t/f_w > 6.0 \quad (1),$$

$$Fno_{(T)} < 3.5 \quad (2), \text{ and}$$

$$\Sigma d/f_t < 0.6 \quad (3),$$

where $f_t$ is the focal length of the entire zoom lens system at the telephoto end, $f_w$ is the focal length of the entire zoom lens system at the wide angle end, $Fno_{(T)}$ is the F-number of the entire zoom lens system at the telephoto end, and $\Sigma d$ is the sum of the thicknesses of the first to fifth lens units, where the thickness of each lens unit refers to the distance on the optical axis from the lens surface closest to the object side to the lens surface closest to the image side in each lens unit.

2. A zoom lens according to claim 1, wherein the second lens unit and the third lens unit move during zooming from the wide angle end to the telephoto end, and the following conditional expression (4) is satisfied:

$$2 < \Delta_{2G}/|\Delta_{3G}| < 5 \quad (4)$$

where $\Delta_{2G}$ is the amount of shift of the second lens unit with zooming from the wide angle end to the telephoto end, $\Delta_{3G}$ is the amount of shift of the third lens unit with zooming from the wide angle end to the telephoto end, where the amounts of shift are calculated as the amounts of shift from the positions of the respective lens units at the wide angle end, and shifts toward the image plane are represented by positive values.

3. A zoom lens according to claim 1, wherein the second lens unit moves during zooming from the wide angle end to the telephoto end, and the following conditional expression (5) is satisfied:

$$0.15 \leq \Delta_{2G}/L_t \leq 0.5 \quad (5),$$

where $\Delta_{2G}$ is the amount of shift of the second lens unit in the zoom lens during zooming from the wide angle end to the telephoto end, shifts toward the image plane being represented by positive values, and $L_t$ is the overall length of the entire zoom lens system at the telephoto end.

4. A zoom lens according to claim 1, wherein the third lens unit moves during zooming from the wide angle end to the telephoto end, and the following conditional expression (6) is satisfied:

$$0.05 \leq |\Delta_{3G}|/L_t \leq 0.2 \quad (6),$$

where $A_{3G}$ is the amount of shift of the third lens unit in the zoom lens during zooming from the wide angle end to the telephoto end, shifts toward the image plane being represented by positive values, and $L_t$ is the overall length of the entire zoom lens system at the telephoto end.

5. A zoom lens according to claim 1, wherein the following conditional expression (7) is satisfied:

$$0.2 < (\beta_{2T}/\beta_{2w})/(f_t/f_w) < 0.6 \quad (7),$$

where $\beta_{2T}$ is the lateral magnification of the second lens unit at the telephoto end of the focal length range of the zoom lens, and $\beta_{2w}$ is the lateral magnification of the second lens unit at the wide angle end of the focal length range of the zoom lens.

6. A zoom lens according to claim 1, wherein the following conditional expression (8) is satisfied:

$$0.1 < (\beta_{3T}/\beta_{3w})/(f_t/f_w) < 0.3 \quad (8),$$

where $\beta_{3T}$ is the lateral magnification of the third lens unit at the telephoto end of the focal length range of the zoom lens, and $\beta_{3w}$ is the lateral magnification of the third lens unit at the wide angle end of the focal length range of the zoom lens.

7. A zoom lens according to claim 1, wherein the following conditional expression (9) is satisfied:

$$0.05 < |f_2|/f_t < 0.2 \quad (9),$$

where $f_2$ is the focal length of the second lens unit.

8. A zoom lens according to claim 1, wherein the following conditional expression (10) is satisfied:

$$0.05 < f_3/f_t < 0.3 \quad (10),$$

where $f_3$ is the focal length of the third lens unit.

9. A zoom lens according to claim 1, wherein the following conditional expression (11) is satisfied:

$$0.1 < f_5/f_t < 0.8 \quad (11),$$

where $f_5$ is the focal length of the fifth lens unit.

10. A zoom lens according to claim 1, wherein the fourth lens unit consists of one lens.

11. A zoom lens according to claim 1, wherein the fourth lens unit moves during zooming.

12. An image pickup apparatus comprising:
a zoom lens according to claim 1; and
an image pickup element disposed on the image side of the zoom lens and having an image pickup element having an image pickup surface that receives an image formed by zoom lens.

13. A zoom lens consisting of, in order from the object side:
a first lens unit having a positive refractive power;
a second lens unit having a negative refractive power;
a third lens unit having a positive refractive power;
a fourth lens unit having a negative refractive power; and
a fifth lens unit having a positive refractive power, wherein
the second lens unit consists of three lenses,
the fifth lens unit consists of one lens,
the first lens unit moves during zooming from the wide angle end to the telephoto end, and
the following conditional expressions (1), (2), and (3) are satisfied, $$f_t/f_w > 6.0 \quad (1),$$

$$Fno_{(T)} < 3.5 \quad (2), \text{ and}$$

$$\Sigma d/f_t < 0.6 \quad (3),$$

where $f_t$ is the focal length of the entire zoom lens system at the telephoto end, $f_w$ is the focal length of the entire zoom lens system at the wide angle end, $Fno_{(T)}$ is the F-number of the entire zoom lens system at the telephoto end, and $\Sigma d$ is the sum of the thicknesses of the first to fifth lens units, where the thickness of each lens unit refers to the distance on the optical axis from the lens surface closest to the object side to the lens surface closest to the image side in each lens unit.

* * * * *